(12) United States Patent
Hamada et al.

(10) Patent No.: US 10,424,199 B2
(45) Date of Patent: Sep. 24, 2019

(54) COMMUNICATION APPARATUS, OPERATION ASSISTANCE APPARATUS, AND OPERATION ASSISTANCE SYSTEM

(71) Applicant: Mitsubishi Electric Corporation, Chiyoda-ku (JP)

(72) Inventors: Yuji Hamada, Tokyo (JP); Yuji Igarashi, Tokyo (JP); Takatoshi Tosa, Tokyo (JP); Masahiko Ikawa, Tokyo (JP); Hiroki Konaka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 165 days.

(21) Appl. No.: 15/112,082

(22) PCT Filed: Feb. 10, 2015

(86) PCT No.: PCT/JP2015/053634
§ 371 (c)(1),
(2) Date: Jul. 15, 2016

(87) PCT Pub. No.: WO2015/122406
PCT Pub. Date: Aug. 20, 2015

(65) Prior Publication Data
US 2016/0351049 A1 Dec. 1, 2016

(30) Foreign Application Priority Data
Feb. 13, 2014 (JP) .................. 2014-025456

(51) Int. Cl.
*G08G 1/09* (2006.01)
*G08G 1/0967* (2006.01)
(Continued)

(52) U.S. Cl.
CPC .......... *G08G 1/0967* (2013.01); *G08G 1/162* (2013.01); *H04M 1/00* (2013.01);
(Continued)

(58) Field of Classification Search
CPC ....... G08G 1/0967; G08G 1/162; H04M 1/00; H04M 1/72527; H04M 1/72569;
(Continued)

(56) References Cited

U.S. PATENT DOCUMENTS 6,327,522 B1   12/2001  Kojima et al.
7,095,336 B2 *  8/2006  Rodgers ................. G08G 1/161
                                                      340/435

(Continued)

FOREIGN PATENT DOCUMENTS

CN       102044145 A     5/2011
DE       103 34 203 A1   3/2005

(Continued)

OTHER PUBLICATIONS

International Search Report dated May 19, 2015 in PCT/JP15/053634 Filed Feb. 10, 2015.

(Continued)

*Primary Examiner* — Naomi J Small
(74) *Attorney, Agent, or Firm* — Oblon, McClelland, Maier & Neustadt, L.L.P.

(57) ABSTRACT

A technique controlling transmission and display of terminal information in accordance with a movement state and an operation state. A communication unit transmits terminal information including at least movement information of a communication apparatus to another communication apparatus, and receives other terminal information including at least movement information of the other communication apparatus from the other communication apparatus. A terminal information controller controls transmission of the terminal information from the communication unit to the other communication apparatus based on the movement state estimated by a movement-state estimation unit and the operation state managed by an operation-state management (Continued)

unit, and when it is determined on the basis of the terminal information and the other terminal information received by communication unit that an attention calling state has occurred, controls display information that causes a display to display attention calling information on the basis of the movement state and the operation state.

10 Claims, 16 Drawing Sheets

(51) Int. Cl.
| | |
|---|---|
| H04W 4/029 | (2018.01) |
| H04M 1/725 | (2006.01) |
| H04M 1/00 | (2006.01) |
| H04W 4/02 | (2018.01) |
| G08G 1/16 | (2006.01) |

(52) U.S. Cl.
CPC ... *H04M 1/72527* (2013.01); *H04M 1/72569* (2013.01); *H04W 4/027* (2013.01); *H04W 4/029* (2018.02); *H04M 1/72572* (2013.01); *H04M 1/72577* (2013.01)

(58) Field of Classification Search
CPC ......... H04M 1/72572; H04M 1/72577; H04W 4/027; H04W 4/028
USPC ........................................................ 340/905
See application file for complete search history.

(56) References Cited

U.S. PATENT DOCUMENTS

| | | | |
|---|---|---|---|
| 7,679,499 B2 | 3/2010 | Yamada | |
| 8,253,589 B2 | 8/2012 | Grimm et al. | |
| 2002/0038178 A1* | 3/2002 | Talkenberg | A63B 24/0021 701/532 |
| 2011/0090093 A1 | 4/2011 | Grimm et al. | |
| 2011/0208545 A1* | 8/2011 | Kuester | G06Q 40/08 705/4 |
| 2012/0032806 A1* | 2/2012 | Lee | H04M 1/72577 340/573.1 |
| 2012/0262582 A1* | 10/2012 | Kimchi | H04M 1/72569 348/159 |
| 2013/0057638 A1* | 3/2013 | Tamkivi | H04W 4/027 348/14.02 |
| 2013/0187792 A1* | 7/2013 | Egly | G08G 1/0965 340/901 |
| 2014/0012492 A1* | 1/2014 | Bowers | G08G 1/16 701/301 |
| 2014/0066097 A1* | 3/2014 | Kolodziej | H04W 4/023 455/456.3 |
| 2014/0132404 A1* | 5/2014 | Katoh | B60R 21/013 340/436 |
| 2015/0006077 A1* | 1/2015 | Baid | G01C 21/3697 701/533 |
| 2015/0035685 A1* | 2/2015 | Strickland | B60Q 9/008 340/901 |
| 2015/0091740 A1* | 4/2015 | Bai | G08B 21/06 340/901 |
| 2015/0109149 A1* | 4/2015 | Duncan | G08G 1/005 340/944 |
| 2015/0316383 A1* | 11/2015 | Donikian | G01C 21/165 701/408 |
| 2016/0343256 A1* | 11/2016 | Song | H04W 4/029 |

FOREIGN PATENT DOCUMENTS

| | | |
|---|---|---|
| DE | 10 2004 045 483 A1 | 4/2006 |
| DE | 10 2008 049 824 A1 | 4/2010 |
| DE | 10 2010 022 433 A1 | 12/2011 |
| DE | 10 2010 051 205 A1 | 5/2012 |
| DE | 20 2011 110 335 U1 | 8/2013 |
| JP | 2011-253403 A | 12/2011 |
| JP | 2012-253708 A | 12/2012 |
| JP | 2013-32932 A | 2/2013 |
| JP | 2013-171445 A | 9/2013 |
| JP | 2014-142798 A | 8/2014 |

OTHER PUBLICATIONS

International Preliminary Report on Patentability and Written Opinion dated Aug. 25, 2016 in PCT/JP2015/053634 with English translation.
Combined Chinese Office Action and Search Report dated May 22, 2017 in Patent Application No. 201580004182.2 (with Partial English Translation of Search Report).
Office Action dated Dec. 14, 2018 in German Patent Application No. 11 2015 000 804.7, 16 pages (with English translation).

* cited by examiner

F I G . 2

| OPERATION STATE | NOT IN OPERATION | | | IN OPERATION | | IN OPERATION | |
| --- | --- | --- | --- | --- | --- | --- | --- |
| | SCREEN OFF | SCREEN ON | | SCREEN ON | | SCREEN OPERATION IN PROGRESS | CALL IN PROGRESS |
| MOVEMENT STATE | | X SECONDS OR MORE AFTER OPERATION | | WITHIN X SECONDS AFTER OPERATION | | | |
| STATIONARY (STANDING/SITTING) | ×/× | ×/× | | ×/× | | ○/× | ○/× |
| WALKING | × | ○ | | ○ | | ○ | ○ |
| RUNNING | × | ○ | | ○ | | ○ | ○ |
| BICYCLE | × | ○ | | ○ | | ○ | ○ |
| MOTORCYCLE | × | ○ | | ○ | | ○ | ○ |
| AUTOMOBILE (DRIVING/RIDING) | ○/× | ○/× | | ○/× | | ○/× | ○/× |
| BUS | × | × | | × | | × | × |
| TRAIN | × | × | | × | | × | × |
| NOT HOLDING DEVICE | × | × | | × | | × | × |

[DISPLAY CONTROL FOR CALLING ATTENTION]
○:DISPLAY, ×:DO NOT DISPLAY

F I G. 3

| OPERATION STATE / MOVEMENT STATE | NOT IN OPERATION | | | IN OPERATION SCREEN ON | IN OPERATION | |
|---|---|---|---|---|---|---|
| | SCREEN OFF | SCREEN ON | | | SCREEN OPERATION IN PROGRESS | CALL IN PROGRESS |
| | | X SECONDS OR MORE AFTER OPERATION | WITHIN X SECONDS AFTER OPERATION | | | |
| STATIONARY (STANDING/SITTING) | ×/× | ×/× | ○/× | ○/× | ○/× |
| WALKING | ○ | ○ | ○ | ○ | ○ |
| RUNNING | ○ | ○ | ○ | ○ | ○ |
| BICYCLE | ○ | ○ | ○ | ○ | ○ |
| MOTORCYCLE | ○ | ○ | ○ | ○ | ○ |
| AUTOMOBILE (DRIVING/RIDING) | ○/× | ○/× | ○/× | ○/× | ○/× |
| BUS | × | × | × | × | × |
| TRAIN | × | × | × | × | × |
| NOT HOLDING DEVICE | × | × | × | × | × |

[TRANSMISSION CONTROL OF POSITION INFORMATION]
○:TRANSMIT, ×:DO NOT TRANSMIT

F I G. 4

| OPERATION STATE \ MOVEMENT STATE | NOT IN OPERATION | | | IN OPERATION | | IN OPERATION | |
|---|---|---|---|---|---|---|---|
| | SCREEN OFF | SCREEN ON | | SCREEN ON | | SCREEN OPERATION IN PROGRESS | CALL IN PROGRESS |
| | | X SECONDS OR MORE AFTER OPERATION | | WITHIN X SECONDS AFTER OPERATION | | | |
| STATIONARY (STANDING/SITTING) | ×/× | ×/× | | ○/× | | ○/× | ○/× |
| WALKING | ○ | ○ | | ○ | | ○ | ○ |
| RUNNING | ○ | ○ | | ○ | | ○ | ○ |
| BICYCLE | ○ | ○ | | ○ | | ○ | ○ |
| MOTORCYCLE | ○ | ○ | | ○ | | ○ | ○ |
| AUTOMOBILE (DRIVING/RIDING) | ○/○ | ○/○ | | ○/○ | | ○/○ | ○/○ |
| BUS | × | × | | × | | × | × |
| TRAIN | × | × | | × | | × | × |
| NOT HOLDING DEVICE | × | × | | × | | × | × |

[CONTROL FOR ENABLING/DISABLING WIRELESS FUNCTION]
○:ENABLED, ×:DISABLED

FIG. 5

| OPERATION STATE<br>MOVEMENT STATE | NOT IN OPERATION | | | IN OPERATION | IN OPERATION | IN OPERATION |
|---|---|---|---|---|---|---|
| | SCREEN OFF | SCREEN ON | SCREEN ON | SCREEN ON | SCREEN OPERATION IN PROGRESS | CALL IN PROGRESS |
| | | X SECONDS OR MORE AFTER OPERATION | | WITHIN X SECONDS AFTER OPERATION | | |
| STATIONARY (STANDING/SITTING) | -/- | -/- | | 5000/- | 5000/- | 5000/- |
| WALKING | 3000 | 2000 | | 1000 | 1000 | 1000 |
| RUNNING | 2000 | 1000 | | 1000 | 500 | 500 |
| BICYCLE | 1000 | 500 | | 500 | 300 | 300 |
| MOTORCYCLE | 500 | 300 | | 200 | 100 | 100 |
| AUTOMOBILE (DRIVING/RIDING) | 100/- | 100/- | | 100/- | 100/- | 100/- |
| BUS | - | - | | - | - | - |
| TRAIN | - | - | | - | - | - |
| NOT HOLDING DEVICE | - | - | | - | - | - |

TRANSMISSION CYCLE [ms]

FIG. 6

| OPERATION STATE | NOT IN OPERATION | | | IN OPERATION | | IN OPERATION | |
| --- | --- | --- | --- | --- | --- | --- | --- |
| | SCREEN OFF | SCREEN ON | | SCREEN ON | | SCREEN OPERATION IN PROGRESS | CALL IN PROGRESS |
| MOVEMENT STATE | | X SECONDS OR MORE AFTER OPERATION | | WITHIN X SECONDS AFTER OPERATION | | | |
| STATIONARY (STANDING/SITTING) | ×/× | ×/× | | ×/× | | SCREEN/× | AUDIO/× |
| WALKING | × | VIBRATION | | AUDIO | | SCREEN | AUDIO |
| RUNNING | × | VIBRATION | | AUDIO | | SCREEN | AUDIO |
| BICYCLE | × | AUDIO | | AUDIO | | SCREEN | AUDIO |
| MOTORCYCLE | × | AUDIO | | AUDIO | | AUDIO | AUDIO |
| AUTOMOBILE (DRIVING/RIDING) | ×/× | AUDIO/× | | AUDIO/× | | AUDIO/× | AUDIO/× |
| BUS | × | × | | × | | × | × |
| TRAIN | × | × | | × | | × | × |
| NOT HOLDING DEVICE | × | × | | × | | × | × |

[TYPE OF DISPLAY FOR CALLING ATTENTION]
SCREEN, AUDIO, VIBRATION

FIG. 9

| OPERATION STATE / MOVEMENT STATE | NOT IN OPERATION | | | IN OPERATION | IN OPERATION | |
|---|---|---|---|---|---|---|
| | SCREEN OFF | SCREEN ON | | SCREEN ON | SCREEN OPERATION IN PROGRESS | CALL IN PROGRESS |
| | | X SECONDS OR MORE AFTER OPERATION | WITHIN X SECONDS AFTER OPERATION | | | |
| STATIONARY (STANDING/SITTING) | ×/× | ×/× | ×/× | ×/× | ×/× | ×/× |
| WALKING | × | × | ○ | ○ | ○ | ○ |
| RUNNING | × | ○ | ○ | ○ | ○ | ○ |
| BICYCLE | × | ○ | ○ | ○ | ○ | ○ |
| MOTORCYCLE | × | × | ○ | ○ | ○ | ○ |
| AUTOMOBILE (DRIVING/RIDING) | ○/× | ○/× | ○/× | ○/× | ○/× | ○/× |
| BUS | × | × | × | × | × | × |
| TRAIN | × | × | × | × | × | × |
| NOT HOLDING DEVICE | × | × | × | × | × | × |

[TRANSMISSION CONTROL OF ATTENTION CALLING INFOMATION]
○：TRANSMIT, ×：DO NOT TRANSMIT

F I G . 1 2
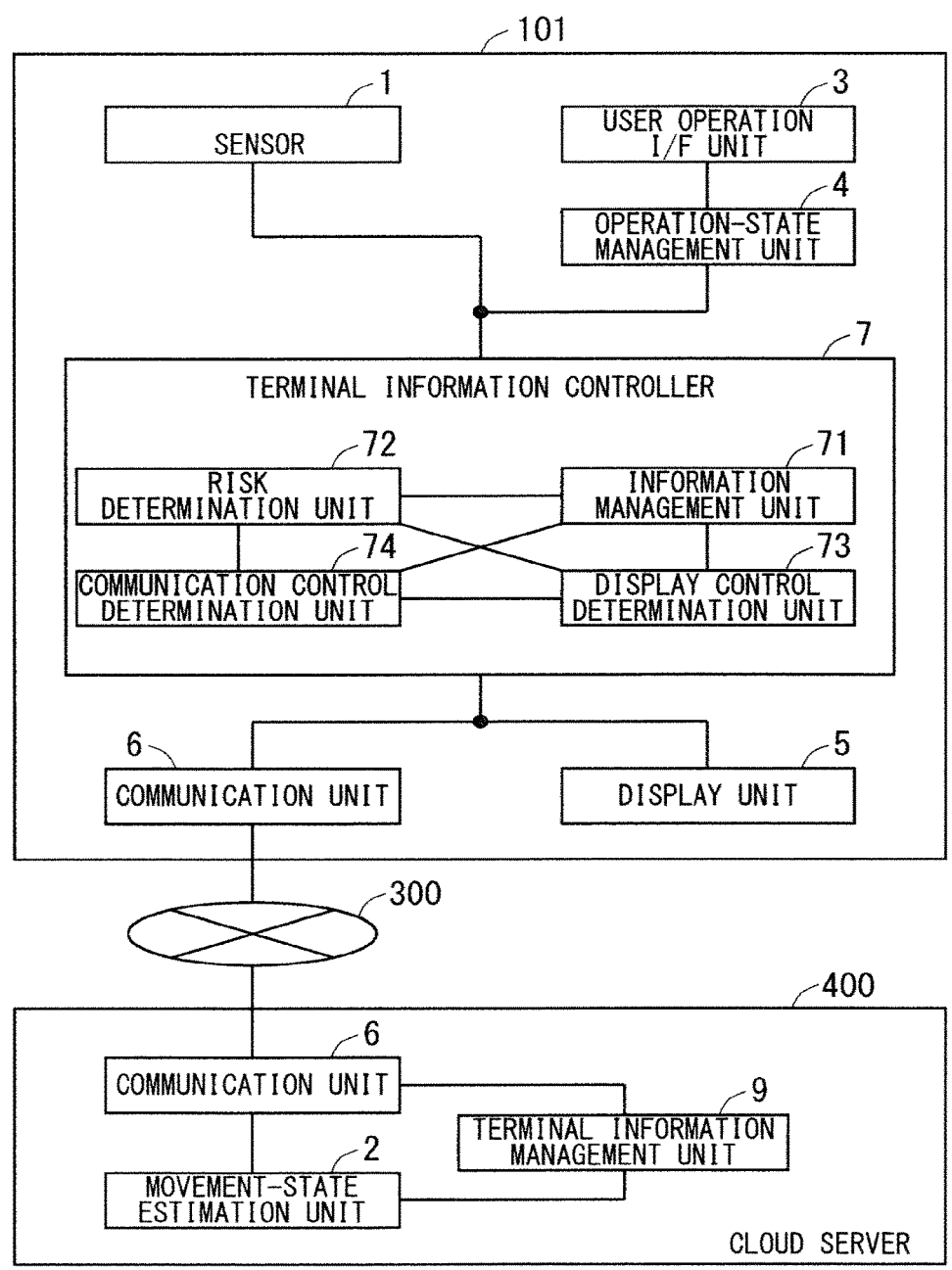

F I G. 1 4

| MAP<br>MOVEMENT STATE | ROAD TYPE | | INDOOR/OUTDOOR | | LINE OF SIGHT | |
|---|---|---|---|---|---|---|
| | PEDESTRIAN-VEHICLE COEXISTENCE | PEDESTRIAN-VEHICLE SEPARATON | OUTDOOR | INDOOR | INSIDE OF LINE OF SIGHT | OUTSIDE OF LINE OF SIGHT |
| STATIONARY(STANDING/SITTING) | × | × | × | × | × | × |
| WALKING | ○ | × | ○ | × | × | ○ |
| RUNNING | ○ | × | ○ | × | × | ○ |
| BICYCLE | ○ | × | ○ | × | ○ | ○ |
| MOTORCYCLE | ○ | × | ○ | × | ○ | ○ |
| AUTOMOBILE (DRIVING/RIDING) | ○/× | ×/× | ○/× | ×/× | ○/× | ○/× |
| BUS | × | × | × | × | × | × |
| TRAIN | × | × | × | × | × | × |
| NOT HOLDING DEVICE | × | × | × | × | × | × |

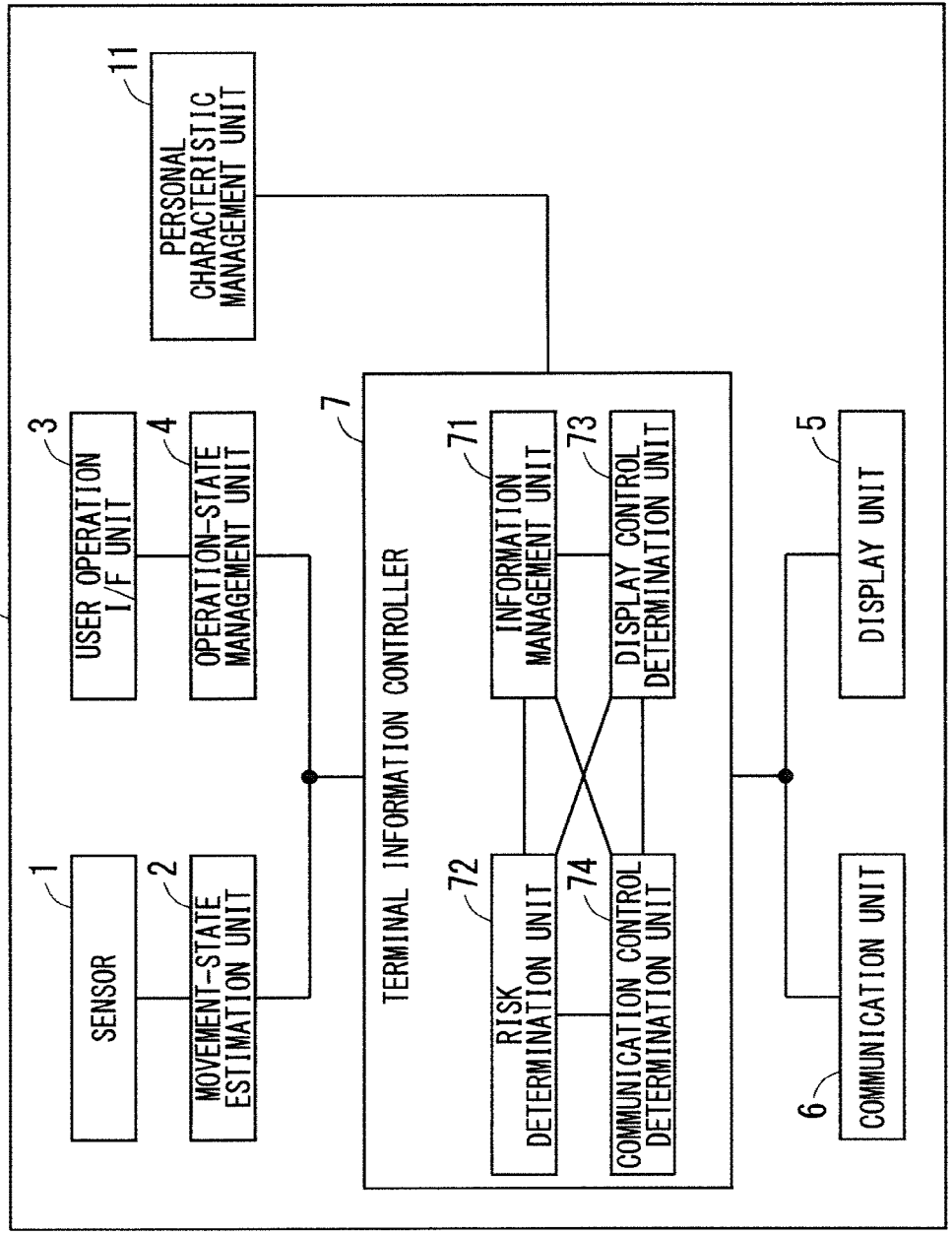

F I G . 1 6
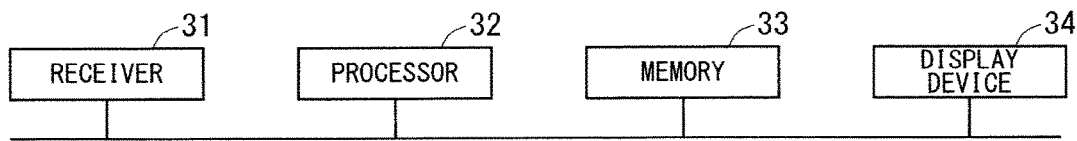

COMMUNICATION APPARATUS, OPERATION ASSISTANCE APPARATUS, AND OPERATION ASSISTANCE SYSTEM

TECHNICAL FIELD

The present invention relates to a communication apparatus for controlling communication and display of moving objects such as mobile phones, smartphones, and onboard communication equipment, an operation assistance apparatus, and an operation assistance system.

BACKGROUND ART

In recent years, widespread use of preventive safety systems such as pre-crash safety systems has led to a decline in the number of fatalities in traffic accidents between vehicles, but the number of traffic accidents involving pedestrians and bicycles remains high. Meanwhile, widespread use of smartphones has increased the occurrence of accidents due to users looking at the screen in order to operate their terminals while walking or cycling, which has become a social problem.

To restrict such operations of terminals by pedestrians, Patent Document 1, for example, discloses a technique for estimating the state of a user, such as stationary, walking, running, or moving by vehicles, and then temporarily stopping operation of a program that is running, turning display off, or controlling input to screen operations.

Meanwhile, in order to avoid accidents between pedestrians and vehicles, studies are in progress on operation assistance using pedestrian-vehicle communication systems in which position information concerning pedestrians is periodically transmitted to call the attention of vehicle drivers. Patent Document 2, for example, discloses an example in which the timing of transmission of terminal identification information and the output of information are controlled in accordance with the walking travel speed.

PRIOR ART DOCUMENTS

Patent Documents

Patent Document 1: Japanese Patent Application Laid-Open No. 2013-032932
Patent Document 2: Japanese Patent Application Laid-Open No. 2013-171445

SUMMARY OF THE INVENTION

Problems to be Solved by the Invention

With techniques such as disclosed in Patent Document 1, programs or screens are stopped or restricted, having taken user activity into consideration, but the surrounding circumstances of users are not taken into consideration. Thus, programs or screens are stopped or restricted even in such circumstances that there is no need to call the attention of the users, possibly impairing the convenience of the users.

With techniques such as disclosed in Patent Document 2, the timing and frequency of transmission of radio waves are controlled in accordance with walking speed, and because all users transmit terminal identification information, congestion of radio waves may occur or the processing load on a receiving terminal may increase.

The present invention has been achieved to solve problems as described above, and it is an object of the present invention to provide a communication apparatus for controlling transmission and display of terminal information in accordance with movement states and operation states of mobile terminals such as mobile phones or smartphones, an operation assistance apparatus, and an operation assistance system.

Means for Solving the Problems

The communication apparatus according to the present invention is a communication apparatus for wirelessly communicating with another movable communication apparatus and being movable along with a moving object. The communication apparatus includes a movement-state estimation processing circuitry that estimates a movement state of the moving object on the basis of information that includes movement information of the communication apparatus that is detected by a sensor that targets the communication apparatus for detection, an operation-state management processing circuitry that specifies an operation state of operations performed on the communication apparatus by a user, and manages the operation state that includes a time elapsed after a latest operation was performed on the communication apparatus, a communication processing circuitry that transmits terminal information that includes at least movement information of the communication apparatus to the another communication apparatus, and receives another terminal information that includes at least movement information of the another communication apparatus from the another communication apparatus, and a terminal information controller that controls transmission of the terminal information from the communication processing circuitry to the another communication apparatus on the basis of the movement state estimated by the movement-state estimation processing circuitry and the operation state managed by the operation-state management processing circuitry, and when it is determined on the basis of the terminal information and the another terminal information received by the communication processing circuitry that an attention calling state has occurred, controls display information that causes a display to display attention calling information on the basis of the movement state and the operation state.

Effects of the Invention

According to the communication apparatus, the operation assistance apparatus, and the operation assistance system of the present invention, it is possible to provide an appropriate user with the danger of other users or vehicles approaching, by controlling the transmission of terminal information and output of display information on the basis of the movement state of the communication apparatus and the state of operations by the user, and therefore to reduce accidents caused or suffered by the user.

The objects, features, preferred embodiments, and advantages of the present invention will become apparent from the following detailed description and the attached drawings.

BRIEF DESCRIPTION OF THE DRAWINGS

FIG. 2 illustrates an example of a display decision table.
FIG. 3 illustrates an example of a transmission decision table.

FIG. 4 illustrates an example of a communication-function decision table.

FIG. 5 illustrates an example of a transmission-cycle control table.

FIG. 6 illustrates an example of a display-type decision table.

FIG. 9 illustrates an example of an attention calling transmission decision table.

FIG. 12 is a schematic diagram of an operation assistance system that includes a communication apparatus according to Preferred Embodiment 3 of the present invention.

FIG. 14 illustrates an example of a table for use in control based on a movement state estimated by a movement-state estimation unit and map information stored in a map information storage according to Preferred Embodiment 4 of the present invention.

FIG. 15 is a schematic diagram of a communication apparatus according to Preferred Embodiment 5 of the present invention.

FIG. 16 is a block diagram of a hardware configuration of the communication apparatus according to Preferred Embodiment 1 of the present invention.

PREFERRED EMBODIMENTS FOR IMPLEMENTING THE INVENTION

Hereinafter, preferred embodiments of the present invention will be described in detail with reference to the drawings.

Preferred Embodiment 1

Figure 1:
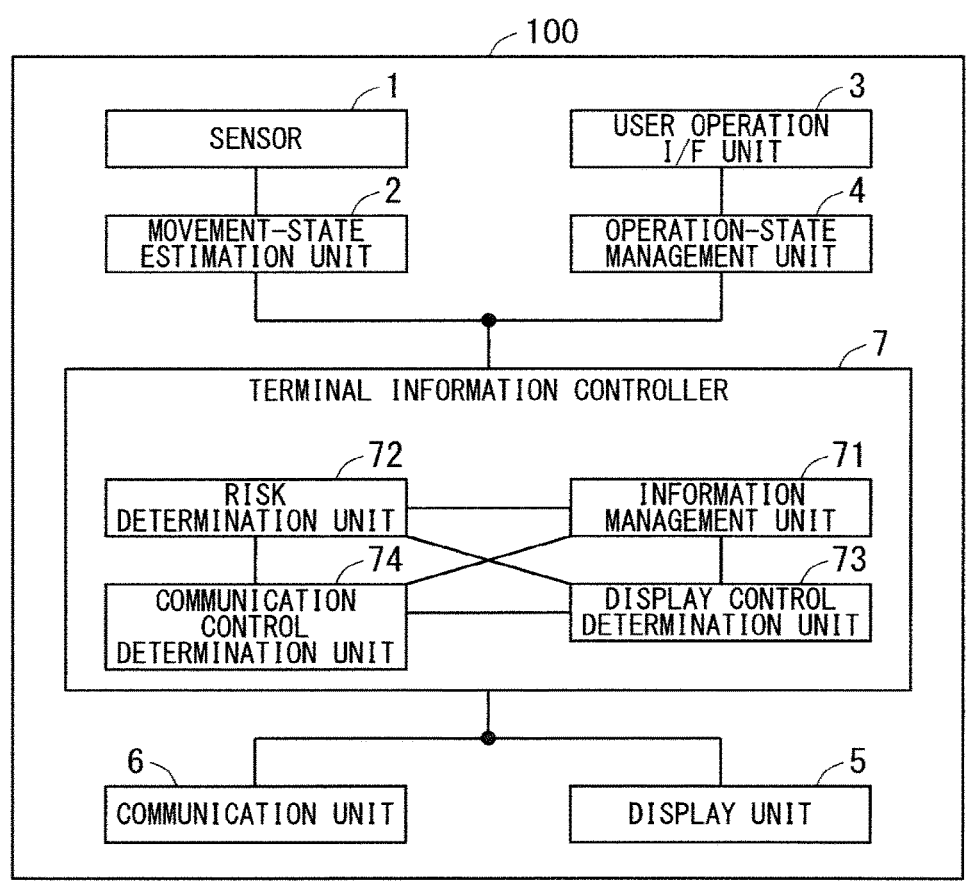
FIG. 1 is a block diagram of a configuration of a communication apparatus according to Preferred Embodiment 1 of the present invention.

FIG. 1 is a block diagram of a configuration of a communication apparatus 100 according to Preferred Embodiment 1 of the present invention. As illustrated in FIG. 1, the communication apparatus 100 includes a sensor 1, a movement-state estimation unit 2, a user operation I/F unit 3, an operation-state management unit 4, a display unit 5, a communication unit 6, and a terminal information controller 7.

The communication apparatus 100 of Preferred Embodiment 1 is a communication apparatus that is movable along with a moving object. Examples of the communication apparatus include a mobile phone, a smartphone, a tablet, an access point, a personal computer, and onboard communication equipment, but the communication apparatus 100 is not limited to the examples given above. In Preferred Embodiment 1, one or more communication apparatuses 100 constitute an operation assistance system.

The sensor 1 senses information for specifying the movement state of a moving object, the sensing information includes movement information concerning the communication apparatus 100 (e.g., acceleration, gyroscope, gravity, direction, and position of the communication apparatus 100 and a position history of the communication apparatus 100), and outputs the sensing information to the movement-state estimation unit 2.

Note that the sensor 1 may detect a real-time measured value every time the value changes, or may conduct detection in a fixed cycle. Examples of the sensor 1 include an acceleration sensor, a gyroscopic sensor, a global positioning system (GPS), an azimuth sensor, a magnetic field sensor, a gravity sensor, an illuminance sensor, a range sensor, a temperature sensor, and a motion sensor. The sensor 1 is, however, not limited to these examples. The term "sensing information" as used herein refers to, for example, acceleration, gravitational acceleration, angular velocity, azimuth, magnetic field, latitude and longitude, altitude, luminous intensity, illuminance, sound level, and frequency, but is not limited to these examples.

The movement-state estimation unit 2 estimates and recognizes the movement state of the communication apparatus 100, i.e., the movement state of a moving object (e.g., a user who holds the communication apparatus 100), by using the sensing information that is input from the sensor 1, which targets the communication apparatus 100 for detection, and sensing history information. The movement-state estimation unit 2 transmits the estimated movement state and the sensing information to the terminal information controller 7.

When the moving object is a user, the movement state estimated by the movement-state estimation unit 2 includes, for example, the user being stationary (e.g., standing, sitting, or lying down), walking, walking quickly, running, ascending or descending stairs, and not having the communication apparatus 100. When the moving object is a bicycle, the movement state includes, for example, the bicycle being ridden. When the moving object is an automobile, the movement state includes, for example, the automobile being ridden or driven. When the moving object is a bus, the movement state includes, for example, the bus being ridden. When the moving object is a train, the movement state includes, for example, the train being ridden. In addition to the examples described above, examples of the moving object also include a motorcycle, a taxi, an elevator, and an escalator.

Note that the movement state is not limited to the examples described above. The movement state may be classified according to travel speed, but is not limited to this example. An algorithm for estimating the movement state, used by the movement-state estimation unit 2, may be implemented by, for example, extracting feature amounts from sensor data and performing pattern recognition or machine learning. Alternatively, the algorithm may be implemented by using existing techniques or by the user manually registering the movement state and performing pattern matching. The present invention is, however, not limited to these examples. In the present specification, the movement state may also be referred to as "moving means" or a "moving medium."

The sensing history information as used herein refers to, for example, information that is obtained by accumulating data received from the sensor 1 for a predetermined period of time, or past history information distinguished by pattern matching, or a reference pattern for use in estimating the movement state. The present invention is, however, not limited to these examples.

The user operation I/F unit 3 may be an input apparatus such as a touch panel sensor, hardware buttons, or software buttons and the user operation I/F unit 3 receives various types of operations from the user. The user operation I/F unit 3 also senses the line of sight of the user with a built-in camera and detects whether or not the user is looking at the communication apparatus 100. The user operation I/F unit 3 is not limited to a touch panel, buttons, and a camera, and may be implemented by using, for example, sound, motion gestures, the line of sight, or facial expressions. The present invention is, however, not limited to these examples. The user operation I/F unit 3 outputs the detected operation information to the operation-state management unit 4.

The operation-state management unit 4 specifies and manages the operation state which is the state of operations performed on the communication apparatus 100 by the user, such as no operation, operation in progress, time elapsed since operation (time elapsed after latest operation), and call in progress, on the basis of operation information such as operations input from the user operation I/F unit 3 and the past operation history. The operation-state management unit 4 also notifies the terminal information controller 7 of the operation state managed therein. While the operation-state management unit 4 manages the operation state of the communication apparatus 100, such as no operation (state in which the screen is not being operated), operation in progress (state in which the screen is being operated), time elapsed since operation (state in which a predetermined period of time has not elapsed since screen operation, or state in which a predetermined period of time has elapsed since screen operation), and call in progress (state in which the user is on a call), the operation-state management unit 4 may also manage active applications or applications running in the background along with the operation state. The present invention is, however, not limited to these examples. The operation state may be classified into no operation and operation in progress according to the time elapsed after an operation, or may be classified in more detail according to the time elapsed.

The display unit 5 may, for example, be a display screen such as a liquid crystal display or an organic EL display that is used for screen display of, for example, e-mails, browsers, moving images, maps, or games and detects and notifies a screen or program being displayed to the terminal information controller 7. The display unit 5 also displays attention calling information for the user by changing display screens or changing ON/OFF of display screens in response to a display control request received from the terminal information controller 7. The display unit 5 may give a notification to the user by means of not only screen display but also audio or vibrations using a speaker or vibrator.

The display unit 5 may be implemented by the same hardware as the user operation I/F unit 3 in the case of smartphones, or may be implemented by different types of hardware as in the case of heads-up displays. That is, the display unit 5 may be provided within the communication apparatus 100, or may be provided outside the communication apparatus 100.

The display unit 5 may also interrupt other active applications to display or utter the attention calling information. Here, the attention calling information to be provided may be simple information such as "Caution" or "Danger," or may be specific information such as "Caution: Vehicle Approaching," "Caution: Watch Out for Bicyclists," "Caution: Watch Out for Pedestrians," or "Caution: Intersection Ahead," but is not limited to these examples. The information displayed may indicate, for example, text, icons, photographs, audio, and vibrations, but is not limited to these examples. Note that the display unit 5 is rather than means limited to display, and may be other means for calling the attention of the user, such as a speaker that emits audio, a vibrator that transmit vibrations, or a medium whose feel changes.

The communication unit 6 transmits information that is managed and stored by the communication apparatus 100 to a peripheral communication apparatus (another communication apparatus) 100. Here, the communication unit 6 transmits terminal information that includes at least movement information concerning the communication apparatus 100 to the peripheral communication apparatus 100. The communication unit 6 also receives, from the peripheral communication apparatus 100, terminal information concerning the peripheral communication apparatus 100 (other terminal information). which includes at least movement information concerning the peripheral communication apparatus 100. Note that the information may be transmitted or received directly from the communication apparatuses 100, or the information from the communication apparatuses 100 may be transmitted or received via a server.

The communication unit 6 may use mobile telephone networks such as Long Term Evaluation (LTE) or 3G, may use LTE Direct or WiFi (registered trademark) Direct, or may use Bluetooth (registered trademark) or wireless LANs such as IEEE 802.11a/b/g/n/p/ac. Moreover, the communication unit 6 may support either mobile telephone networks or wireless LANs, or may support both and switch between them or use them at the same time. The communication unit 6 controls a radio wave transmission function by switching communication hardware ON/OFF, starts transmission of the terminal information, and switches mobile telephone networks and wireless LANs, which serve as communication media that transmit radio waves, in response to a communication control request received from the terminal information controller 7. Note that the communication unit 6 is capable of transmitting and receiving terminal information in the background even when the communication apparatus 100 is executing other applications such as e-mails or browsers.

The terminal information controller 7 controls ON/OFF of the communication hardware of the communication unit 6, controls start and stop of the transmission of the terminal information from the communication unit 6 to a peripheral communication apparatus 100, controls the cycle of transmission of the terminal information, and switches mobile telephone networks and the wireless LANs, which serve as communication media, on the basis of the movement state acquired from the movement-state estimation unit 2 and the operation state acquired from the operation-state management unit 4. The terminal information controller 7 also calculates the risk of collision or contact (determines whether an attention calling state has occurred) and estimates the state of awareness of the other party on the basis of its own terminal information and the terminal information (other terminal information) received from the peripheral communication apparatus 100 by the communication unit 6. The terminal information controller 7 further controls contents, such as icons and text displayed on the display unit 5 and audio. When it is determined that the attention calling state has occurred, the terminal information controller 7 further controls whether or not to display the attention calling information to the user, controls whether or not to display active program screens, and controls the contents to be displayed, on the basis of the movement state and the operation state, which are received respectively from the movement-state estimation unit 2 and the operation-state management unit 4.

Here, the terminal information indicates movement information (e.g., position, travel speed, and travel direction) concerning the communication apparatus 100 held by the user, personal information such as age and gender, the movement state, movement means (the type of a moving object), the operation state, terminal type (e.g., mobile terminal, onboard terminal, roadside terminal, or server), a terminal identifier, and time, but is not limited to these examples. The message format of the terminal information to be transmitted and received may be newly defined or may be an existing message format for vehicles, but is not limited to these examples.

The terminal information controller 7 includes an information management unit 71, a risk determination unit 72, a display control determination unit 73, and a communication control determination unit 74.

The information management unit 71 receives input of and stores and manages the sensing information detected by the sensor 1, the movement state estimated by the movement-state estimation unit 2, the operation state managed by the operation-state management unit 4, and the terminal information that is received from another communication apparatus 100 via the communication unit 6 and that includes, for example, the sensing information, the movement state, and the operation state. The information management unit 71 periodically outputs the terminal information managed therein to the risk determination unit 72, the display control determination unit 73, and the communication control determination unit 74.

The risk determination unit 72 periodically estimates and calculates a future traveling position on the basis of the positions, travel histories, travel speeds, and travel directions of its own apparatus and of the peripheral communication apparatuses 100, which are managed by the information management unit 71, and calculates the risk of collision, contact, and a near miss. When the risk of collision, contact, or a near miss has been detected by the risk determination unit 72, the risk determination unit 72 identifies a peripheral communication apparatus 100 for which the risk of collision or contact, for example, has been detected, and calculates the current relative distance and the current relative positions. The risk determination unit 72 outputs the risk, the relative distance, and the relative positions to the display control determination unit 73.

When the risk determination unit 72 has detected a high risk of collision or contact, for example (when it is determined that the attention calling state has occurred), the display control determination unit 73 determines whether or not to display the attention calling information on the display unit 5 or determines the contents to be displayed on the display unit 5, on the basis of the movement state and the operation state, which are managed by the information management unit 71. The display control determination unit 73 then controls display information that causes the display unit 5 to display the attention calling information, for example, on the basis of the determination result.

The communication control determination unit 74 controls whether or not to transmit the terminal information to the communication unit 6, controls a transmission cycle for use in transmitting the terminal information from the communication unit 6 to a peripheral communication apparatus 100, and controls whether to enable or disable the communication function, on the basis of the movement state and the operation state, which are managed by the information management unit 71.

Note that the information management unit 71, the risk determination unit 72, the display control determination unit 73, and the communication control determination unit 74 may operate by sharing their respective managed information and calculated information, or may acquire such information only at the time of processing.

Now, one example of conditions used for various types of control by the terminal information controller 7 of the communication apparatus 100 according to Preferred Embodiment 1 will be described with reference to FIGS. 2 to 6. As illustrated in FIGS. 2 to 6, the movement state to be recognized by the movement-state estimation unit 2 is assumed to be one of states where the user is stationary (standing, sitting, or lying down), where the user is walking, where the user is running, where the user is bicycling, where the user is riding a motorcycle, where the user is riding in an automobile (driving or riding), where the user is riding on a bus, where the user is riding on a train, and where the user is not holding the communication apparatus 100.

The operation state that is recognized by the operation-state management unit 4 is assumed to indicate the presence or absence of a screen operation, the presence or absence of screen display, whether several seconds or more has elapsed after the latest screen operation, whether the screen is currently being operated, and whether a call is in progress. Here, the term "operation" refers to a screen touch, buttons, audio, motion gestures, and the line of sight.

In Preferred Embodiment 1, the tables illustrated in FIGS. 2 to 6 are used as a basis to control ON/OFF of attention calling display, control the transmission of the terminal information and the transmission cycle, control ON/OFF of the communication hardware, and switch the type of the attention calling information.

FIG. 2 illustrates an example of a display decision table. FIG. 2 illustrates a table that is used by the display control determination unit 73 of the terminal information controller 7 to determine, on the basis of the movement state and the operation state, whether or not to provide attention calling display on the display unit 5. Here, the table is referred to as a "display decision table."

As illustrated in FIG. 2, for example, when the user is performing a screen operation while walking, it is estimated that the user is not paying attention to the surroundings and therefore the attention calling information is displayed. On the other hand, when the user is not performing a screen operation while walking and the screen is OFF, it is estimated that the user is paying attention to the surroundings and therefore the attention calling information is not displayed.

When the time elapsed after screen operation is within several seconds, it is estimated that the user is looking at the screen, and when bicycling, has a low state of awareness to the surroundings, and thus the attention calling information is displayed. On the other hand, a user who is riding on a train does not need to pay attention to the surroundings and therefore the attention calling information is not displayed. In the other movement states and operation states, the display of information is determined as illustrated in FIG. 2.

FIG. 3 illustrates an example of a transmission decision table. FIG. 3 illustrates a table that is used by the communication control determination unit 74 of the terminal information controller 7 to determine, on the basis of the movement state and the operation state, whether or not to transmit the terminal information via the communication unit 6. Here, the table is referred to as a "transmission decision table."

As illustrated in FIG. 3, for example, when the user is walking, running, bicycling, or riding a motorcycle, the terminal information is transmitted to the surroundings, irrespective of the presence or absence of a screen operation, to notify the presence of the user to the surroundings. On the other hand, when the user is stationary (sitting) or riding on a bus or train, it is estimated that the user will not encounter dangerous situations, irrespective of the presence or absence of a screen operation, and therefore the terminal information is not transmitted. In the other movement states and operation states, the transmission of information is determined as illustrated in FIG. 3.

FIG. 4 illustrates an example of a communication-function decision table. FIG. 4 illustrates a table that is used by the communication control determination unit 74 of the terminal information controller 7 to determine, on the basis of the movement state and the operation state, whether to enable or disable the communication function of the communication unit 6. Here, the table is referred to as a "communication-function decision table."

As illustrated in FIG. 4, for example, when the user is walking, running, bicycling, or riding a motorcycle, the communication function of hardware is enabled, irrespective of the presence or absence of a screen operation, to notify the presence of the user to the surroundings. On the other hand, when the user is stationary (sitting) or riding on a bus or train, it is estimated that the user will not encounter dangerous situations, irrespective of the presence or absence of a screen operation, and therefore the communication function of hardware is disabled. In the other movement states and operation states, information display is determined as illustrated in FIG. 4. Note that the control for enabling or disabling the communication function of hardware is not performed when the user has set to enable the function, and the control for enabling or disabling the function is performed only when the user has set to disable the function.

FIG. 5 illustrates an example of a transmission-cycle control table. FIG. 5 illustrates a table that is used by the communication control determination unit 74 of the terminal information controller 7 to dynamically control the cycle of transmission of the terminal information via the communication unit 6 on the basis of the movement state and the operation state. Here, the table is referred to as a "transmission-cycle control table."

As illustrated in FIG. 5, for example, when the user is performing a screen operating while walking, it is estimated that the user is not paying attention to the surroundings and therefore the terminal information is transmitted in a cycle of 1000 ms. On the other hand, when the user is not performing a screen operation while walking and the screen is OFF, the terminal information is transmitted in a cycle of 3000 ms to notify the presence of the pedestrian to the surroundings. When the user is performing a screen operation while bicycling or riding a motorcycle, the cycle of transmission of the terminal information is controlled to be reduced to, for example, 300 ms or 100 ms, because of a high travel speed.

In this way, the transmission cycle is controlled to be reduced according to the travel speed of the communication apparatus 100, and the transmission cycle is further controlled to be reduced according to the operation state of the screen. In the other movement states and operation states, the transmission cycle of information is determined as illustrated in FIG. 5.

FIG. 6 illustrates an example of a display-type decision table. FIG. 6 illustrates a table that is used by the display control determination unit 73 of the terminal information controller 7 to determine, on the basis of the movement state and the operation state, the type of information to be displayed on the display unit 5. Here, the table is referred to as a "display-type decision table."

As illustrated in FIG. 6, for example, when the user is performing a screen operation while walking or running, the user is highly likely to be looking at the screen, and therefore, control is performed to display icons or text on the screen to call the attention of the user. For the user who is driving a motorcycle or automobile, looking at the screen can pose a danger to the user, and therefore, control is performed to output audio to call the attention of the user. In other movement states and operation states, the type of information to be displayed is determined as illustrated in FIG. 6.

Note that the communication apparatus 100 according to Preferred Embodiment 1 may operate using at least one of the tables illustrated in FIGS. 2 to 6, or may operate using a combination of a plurality of the tables. The values in the tables illustrated in FIGS. 2 to 6 are merely examples, and the present invention is not limited to these examples.

In the communication apparatus 100 according to Preferred Embodiment 1, the ON/OFF control of attention calling display, the control of the transmission of the terminal information and the transmission cycle, the ON/OFF control of the communication hardware, and the switching control of the type of the attention calling information may be provided in the form of applications that operate in the background, may be performed simultaneously with other applications, or may be performed standalone.

Figure 7:
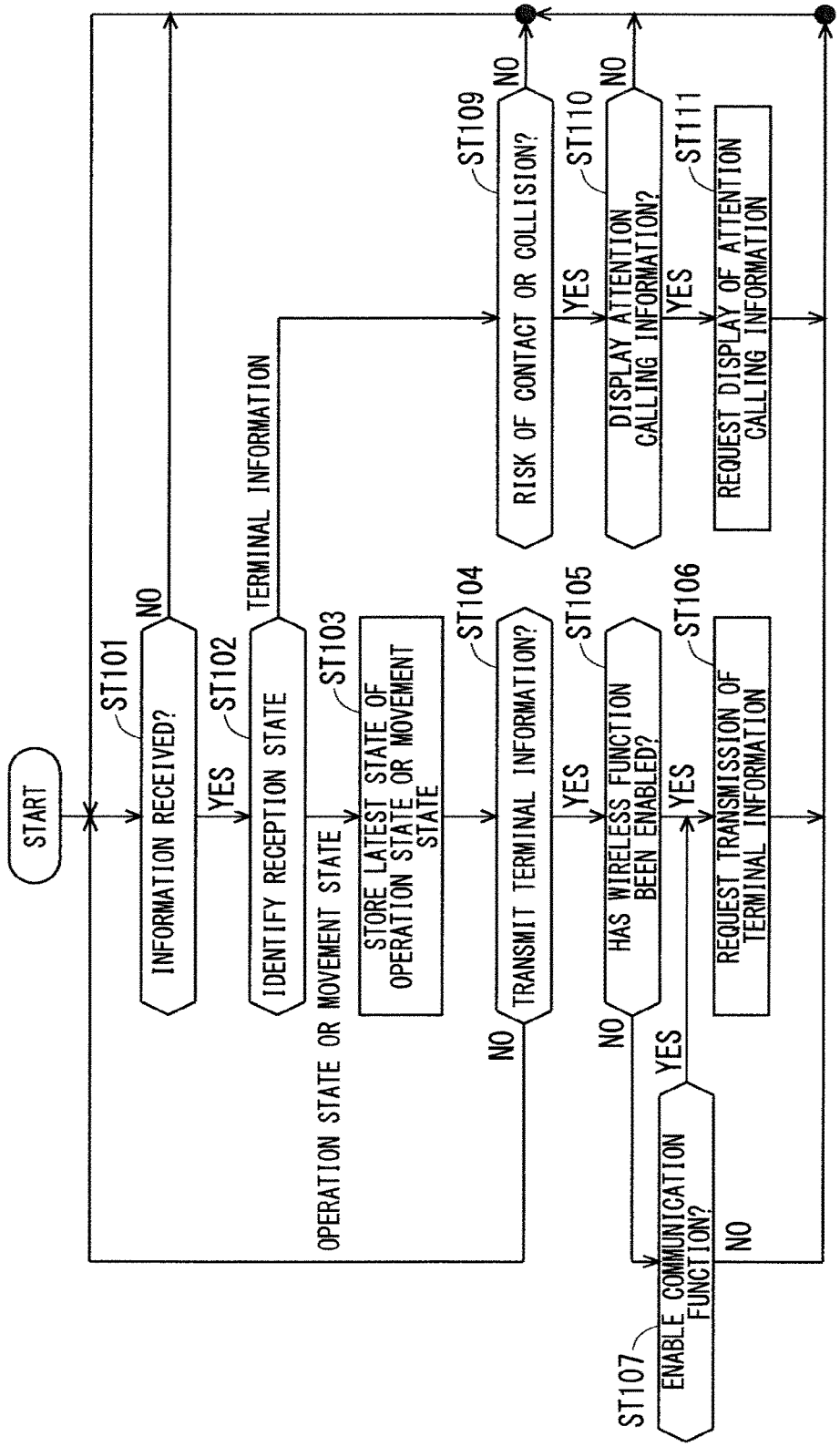
FIG. 7 is a flowchart of operations performed by a terminal information controller according to Preferred Embodiment 1.

Operations will now be described. FIG. 7 is a flowchart of operations performed by the terminal information controller 7 according to Preferred Embodiment 1. Note that the processing performed by the sensor 1, the movement-state estimation unit 2, the user operation I/F unit 3, the operation-state management unit 4, the display unit 5, and the communication unit 6 is basic processing such as detection or transmission and reception as described previously, and therefore, descriptions of the operations using a flowchart are omitted. Hereinafter, control processing such as information display control and transmission control performed by the terminal information controller 7 will be described with reference to FIG. 7. It is assumed that all of the tables illustrated in FIGS. 2 to 6 are used in FIG. 7.

The information management unit 71 of the terminal information controller 7 of the communication apparatus 100 determines whether or not information has been received from the movement-state estimation unit 2, the operation-state management unit 4, or the communication unit 6 after startup (step ST101). When information has not been received in step ST101 ("NO" in step ST101), the information management unit 71 of the terminal information controller 7 returns to step ST101 and waits for the reception of information. When information has been received in step ST101 ("YES" in step ST101), the information management unit 71 of the terminal information controller 7 identifies the type of information (step ST102).

When it is determined in step ST102 that the received information indicates the movement state or the operation state ("Operation State or Movement State" in step ST102), i.e., when the received information is information that is input from the movement-state estimation unit 2 or the operation-state management unit 4 of its own apparatus, the information management unit 71 of the terminal information controller 7 stores and manages the latest state of operation state or movement state received in step ST101 (step ST103).

The communication control determination unit 74 of the terminal information controller 7 determines, on the basis of the transmission decision table in FIG. 3, whether or not to transmit the terminal information to a peripheral communication apparatus 100 (step ST104). More specifically, the communication control determination unit 74 uses the movement state input from the movement-state estimation unit 2 in step S101 and the operation state input from the operation-state management unit 4 in step ST101 to determine, on the basis of the transmission decision table in FIG. 3, whether or not to transmit the terminal information.

When it is determined not to transmit the terminal information in step ST104 ("NO" in step ST104), the procedure returns to step ST101 and waits for the reception of information. When it is determined to transmit the terminal information in step ST104 ("YES" in step ST104), the communication control determination unit 74 of the terminal information controller 7 determines whether the wireless function has been enabled (step ST105).

When it is determined in step ST105 that the function has been enabled ("YES" in step ST105), the communication control determination unit 74 of the terminal information controller 7 requests the communication unit 6 to transmit the terminal information on the basis of the transmission-cycle control table illustrated in FIG. 5 (step ST106).

More specifically, the communication control determination unit 74 uses the movement state input from the movement-state estimation unit 2 in step ST101 and the operation state input from the operation-state management unit 4 in step ST101 to request the transmission of the terminal information on the basis of the transmission-cycle control table in FIG. 5. The procedure then returns to step ST101 and waits for the reception of information.

On the other hand, when it is determined in step ST105 that the function has been disabled ("NO" in step ST105), the communication control determination unit 74 of the terminal information controller 7 determines, on the basis of the communication-function decision table illustrated in FIG. 4, whether or not to enable the communication function (step ST107). More specifically, the communication control determination unit 74 uses the movement state input from the movement-state estimation unit 2 in step ST101 and the operation state input from the operation-state management unit 4 in step ST101 to determine, on the basis of the communication-function decision table in FIG. 4, setting of whether to enable or disable the communication function.

When it is determined to enable the function in step ST107 ("YES" in step ST107), the processing in step ST106 is performed and then the procedure returns to step ST101. When it is determined to keep the function disabled in step ST107 ("NO" in step ST107), the procedure returns to step ST101 and waits for the reception of information.

On the other hand, when it is determined in step ST102 that the received information is terminal information ("Terminal Information" in step ST102), i.e., when the received information is terminal information concerning a peripheral communication apparatus 100 (other terminal information), which has been received via the communication unit 6, the risk determination unit 72 determines, on the basis of the received terminal information (other terminal information) and its own terminal information, whether or not there is the risk of a near miss or collision (step ST109). Here, as a method of calculating and estimating the risk of a near miss and collision, for example, future positions are predicted from the past transition of positions and the travel speed to estimate the risk. Existing techniques such as a collision avoidance system for vehicles may be applied to estimate the risk of a near miss and collision. Here, the risk of a near miss and collision may also be referred to as the "attention calling state," a "collision risk state," "risky," or a "dangerous state."

When it is determined in step ST109 that there is no risk ("NO" in step ST109), the procedure returns to step ST101 and waits for the reception of information. When it is determined in step ST109 that there is a risk ("YES" in step ST109), the display control determination unit 73 of the terminal information controller 7 determines, on the basis of the display decision table illustrated in FIG. 2, whether or not to display the attention calling information (step ST110). More specifically, the display control determination unit 73 receives input of the movement state and the operation state of its own apparatus managed by the information management unit 71 and determines, on the basis of the display decision table in FIG. 2, whether it is necessary to display the attention calling information on the display unit 5.

When it is determined not to display the attention calling information in step ST110 ("NO" in step ST110), the procedure returns to step ST101 and waits for the reception of information. When it is determined to display the attention calling information in step ST110 ("YES" in step ST110), the display control determination unit 73 determines the type of information to be displayed, on the basis of the display-type decision table illustrated in FIG. 6, and then requests the display unit 5 to provide attention calling display (step ST111). More specifically, the display control determination unit 73 receives input of the movement state and the operation state of its own apparatus managed by the information management unit 71, determines the type of information to be displayed on the basis of the display-type decision table in FIG. 6, and requests the display unit 5 to display the attention calling information according to the determined display type. Note that the attention calling information includes, for example, text, icons, photographs, and sounds.

Thereafter, the procedure returns to step ST101 and waits for the reception of the next information.

While Preferred Embodiment 1 shows an example in which the terminal information controller 7 uses all of the tables illustrated in FIGS. 2 to 6, processing may be implemented by using one of the tables, or by using a combination of a plurality of the tables.

While Preferred Embodiment 1 shows an example in which the terminal information controller 7 controls the display unit 5 and the communication unit 6 on the basis of the movement state and the operation state, a configuration is also possible in which information that indicates the movement state and the operation state is output to the display unit 5 and the communication unit 6, and the display unit 5 and the communication unit 6 perform processing, determination, and control.

In Preferred Embodiment 1, the communication apparatus 100 may be a terminal that is dedicated to pedestrians or a terminal that is dedicated to bicyclists, or may be handled as a terminal such as a smartphone or a mobile phone that is usable in automobiles.

While in Preferred Embodiment 1, the display decision table is classified into two categories, i.e., whether or not to display the attention calling information, the display decision table may be further segmentalized by taking the display size into consideration and adding, for example, small icons on the display. Moreover, icons may be displayed to indicate the directions in which attention should be paid or to indicate the types of terminals (types of moving objects such as automobiles, pedestrians, bicycles, and motorcycles) to which attention should be paid.

While Preferred Embodiment 1 shows an example of displaying the attention calling information, active applications may be stopped or operations may be disabled, in addition to the display of the information.

As described above, according to Preferred Embodiment 1, display for calling attention to dangers and the contents to be displayed may be controlled on the basis of the movement state of the user who holds the communication apparatus 100 and the operation information. It is thus possible to prompt inattentive users to pay attention, to assist the user in preventing delayed risk detection, and to notify peripheral communication apparatuses 100 of the presence of inattentive users.

In Preferred Embodiment 1, the communication apparatus 100 communicates with peripheral communication apparatuses 100 on the basis of the movement state of the user who holds the communication apparatus 100 and the operation information. That is, the communication does not involve screen control or application control that may give inconvenience to the user, thus improving user acceptability. Also, the terminal information is transmitted when it is estimated that the user is inattentive. This suppresses unnecessary radio wave transmission, thus avoiding communication congestion and reducing battery consumption.

In Preferred Embodiment 1, ON/OFF of the wireless function is controlled, and accordingly radio waves are transmitted only in situations that require communication. This enables efficient use of the battery of the communication apparatus 100.

In Preferred Embodiment 1, the ON/OFF control of the wireless function includes forcedly turning on the wireless function of a user whose wireless function is OFF, thus enabling the user to be prompted to pay attention.

Moreover, in Preferred Embodiment 1, the transmission of the terminal information and the transmission cycle are controlled. This suppresses excessive transmission of radio waves and avoids communication congestion.

Moreover, in Preferred Embodiment 1, the transmission of information is suppressed in low-risk situations. This reduces the processing load on communication apparatuses that are performing risk determination.

In Preferred Embodiment 1, for example, it is possible to determine only cases where the terminal is held by a pedestrian or where the user is operating the terminal while walking or running as situations that require calling the attention of users, and for a communication apparatus to transmit its own terminal information or display the attention calling information in such cases. This avoids unnecessary transmission and display of information in cases where the user is not operating the terminal or where the user is stationary.

Moreover, in Preferred Embodiment 1, it is possible to determine only cases where the user of the terminal is bicycling or where the user of the terminal is operating the terminal as situations that require calling the attention of users, and for the communication apparatus to display the attention calling information in such cases. In this case, unnecessary display of the information is avoided when the user is not operating the terminal. On the other hand, when the user is bicycling, the communication apparatus transmits its own terminal information to peripheral vehicles and the like, irrespective of whether the situation requires calling the attention of users, and prompts vehicles to pay attention.

In Preferred Embodiment 1, when the user of the terminal is in an automobile or on a train, the communication apparatus does not transmit the terminal information or does not display the attention calling information, irrespective of whether the terminal is being operated. This avoids unnecessary transmission of radio waves and unnecessarily calling the attention of users.

While the communication apparatus 100 of Preferred Embodiment 1 is configured as illustrated in FIG. 1, the configuration of the communication apparatus 100 need only include the sensor 1, the movement-state estimation unit 2, the user operation I/F unit 3, the operation-state management unit 4, the communication unit 6, and the terminal information controller 7. While in Preferred Embodiment 1, the user operation I/F unit 3 and the operation-state management unit 4 are described separately in order to handle the operation state of the terminal, these units may be handled as a single means.

Preferred Embodiment 2

In Preferred Embodiment 1, the communication apparatus 100 is assumed to be held by the user. Preferred Embodiment 2 describes a preferred embodiment in which the communication apparatus 100 of Preferred Embodiment 1 and an automobile equipped with a communication apparatus 200 constitute an operation assistance system. The operation assistance system according to Preferred Embodiment 2 aims to assist drivers of the automobiles in preventing delayed risk detection and to prompt drivers to pay attention to users.

Note that the communication apparatus 200 of the operation assistance system according to Preferred Embodiment 2 of the present invention is mounted to a moving object, and is assumed to be mounted principally to an automobile in the following description. Also, the users holding the communication apparatuses of Preferred Embodiment 2 are principally assumed to be pedestrians or bicyclists in the following description.

Figure 8:
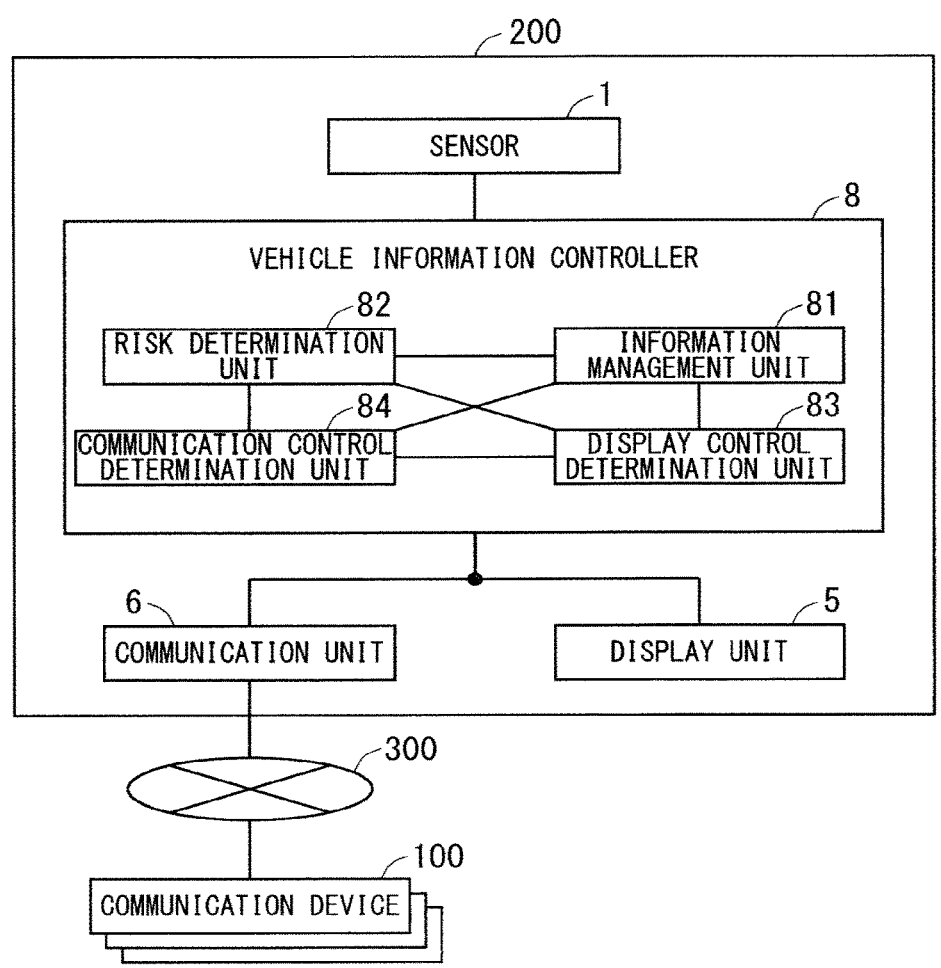
FIG. 8 is a schematic diagram of an operation assistance system according to Preferred Embodiment 2 of the present invention.

FIG. 8 is a schematic diagram of the operation assistance system according to Preferred Embodiment 2 of the present invention. In FIG. 8, constituent elements that are similar to those described with reference to FIG. 1 in Preferred Embodiment 1 are given the same reference numerals, and redundant detailed descriptions thereof are omitted.

The operation assistance system according to Preferred Embodiment 2 of the present invention includes communication apparatuses 100, the communication apparatus 200, and a communication network 300 as illustrated in FIG. 8.

In FIG. 8, the communication apparatus 200 differs from the communication apparatus 100 of Preferred Embodiment 1 in that the communication apparatus 200 does not include the movement-state estimation unit 2, the user operation I/F unit 3, and the operation-state management unit 4 and that the communication apparatus 200 includes a vehicle information controller 8, instead of the terminal information controller 7. Note that the communication apparatus 200 in FIG. 8 has a similar configuration to the configuration of the communication apparatus 100 described in Preferred Embodiment 1.

The communication apparatus 200 of Preferred Embodiment 2 includes a sensor 1, a display unit 5, a communication unit 6, and the vehicle information controller 8 as illustrated in FIG. 8. Examples of the communication apparatus 200 include onboard communication equipment that is mounted to, for example, automobiles, motorcycles, buses, and taxis. The communication apparatus 200 may also be mounted to mobile phones or smartphones as in Preferred Embodiment 1, and is not limited to these examples.

The communication apparatus 200 is connected to the communication apparatuses 100 via the communication network 300. While FIG. 8 illustrates one communication apparatus 200 and three communication apparatuses 100, the communication apparatuses 100 and 200 include at least two communication apparatuses, and may include a plurality of communication apparatuses.

The communication network 300 is a communication medium that connects one or more communication apparatuses 100 and one or more communication apparatuses 200 via a wired or wireless network. Here, the wired network may, for example, be Ethernet (registered trademark) or optical fiber. The wireless network may use communication such as LTE, wireless local area networks (LANs), WiMAX (Worldwide Interoperability for Microwave Access), or GSM (registered trademark) (Global System for Mobile Communication). Note that the communication network 300 includes cases where communication is established via base stations or access points and where direct communication is established between the communication apparatuses 100 and 200.

One of the communication apparatuses 100 and 200 of Preferred Embodiment 2 may also be referred to as "operation assistance apparatuses."

The vehicle information controller 8 of the communication apparatus 200 basically has similar functions to the functions of the terminal information controller 7 of the communication apparatus 100 according to Preferred Embodiment 1. The vehicle information controller 8 periodically transmits the terminal information by itself, irrespective of the movement state and the operation state, and presents the attention calling information to the driver on the basis of the terminal information received from the peripheral communication apparatuses 100 and 200, irrespective of the movement state and the operation state.

The vehicle information controller 8 of the communication apparatus 200 estimates the state of awareness of the communication apparatus 100 and 200 that are transmission sources and calculates the risk of collision or contact on the basis of its own movement information detected by the sensor 1, the movement information, the movement state, and the operation state which are included in the terminal information received from the peripheral communication apparatuses 100 and 200, and displays attention calling information such as icons, text, and contents on the display unit 5. In Preferred Embodiment 2, the movement information detected by the sensor 1 includes control information that indicates a control state of at least one of an accelerator, brakes, and steering. When the communication apparatuses 100 and 200, which are transmission sources, have a low state of awareness, the vehicle information controller 8 requests the communication unit 6 to transmit information such as attention calling information or a warning to prompt the users of the communication apparatuses 100 and 200 to pay attention.

Note that the communication apparatus 200 may directly transmit and receive information to and from the communication apparatus 100 and 200, or information from the communication apparatuses 100 and 200 may be transmitted or received via a server. While icons, text, and sounds, for example, are given as examples of the attention calling information displayed on the display unit 5, the attention calling information may include moving means such as pedestrians, bicycles, or motorcycles as specific targets to which attention should be paid, or may include the operation states of terminal users.

The vehicle information controller 8 of the communication apparatus 200 includes an information management unit 81, a risk determination unit 82, a display control determination unit 83, and a communication control determination unit 84.

The information management unit 81 receives input of information that the communication unit 6 has received from the surrounding communication apparatus 100 and 200. Unlike the information management unit 71 of the communication apparatus 100, the information management unit 81 does not manage the movement state and the operation state of its own apparatus.

The risk determination unit 82 periodically estimates and calculates a future traveling position and calculates the risk of collision, contact, or a near miss (determines whether the attention calling state has occurred) on the basis of movement information, the movement state, and the operation state included in the terminal information received from the peripheral communication apparatuses 100 and 200, and the movement information (position information) concerning its own apparatus. When the risk of collision, contact, or a near miss has been detected, the risk determination unit 82 specifies the corresponding communication apparatus 100, 200 and calculates a current relative distance and current relative positions. The risk determination unit 82 outputs the risk, the relative distance, and the relative positions to the display control determination unit 83.

When the risk determination unit 82 has detected a high risk of collision, contact, or a near miss, the display control determination unit 83 determines to display the attention calling information on the basis of the movement state and the operation state that are received from the peripheral communication apparatus 100, 200. Since the display control determination unit 83 is assumed to be mounted to a vehicle, the attention calling information is assumed to be audio or icons, for example.

When the attention calling information has been received from the peripheral communication apparatuses 100 and 200, the display control determination unit 83 determines whether or not to display the attention calling information, on the basis of the movement state and the operation state of the peripheral communication apparatus 100, 200 that the information management unit 81 has received from the peripheral communication apparatuses 100 and 200.

The communication control determination unit 84 transmits the terminal information regularly, unlike the communication control determination unit 74 of the communication apparatus 100. Thus, the communication control determination unit 84 does not control whether or not to transmit information, the transmission cycle, or whether to enable or disable the communication function.

When the risk determination unit 82 has detected a high risk of a collision or contact, the communication control determination unit 84 determines whether or not to transmit the attention calling information to the communication apparatus 100 or 200 targeted as a risk, and when there is a risk, requests the communication unit 6 to transmit the attention calling information.

The communication units 6 of the communication apparatuses 100 and 200 of Preferred Embodiment 2 may use, as a message format or data set of the terminal information to be transmitted or received, formats such as Cooperative Awareness Message (CAM) and Decentralized Environmental Notification Message (DENM) that are standardized by ETSI EN 302-637 in Europe, or may use formats for Intelligent Transport Systems (ITS) that are standardized by SAE J2735 in North America.

The communication units 6 store information such as the movement states and the operation states in a reserved partition or extended partition in the standard message format, and transmit and receive the information. In this way, the vehicle information controller 8 is capable of acquiring the movement states and the operation states from the extension message, thus facilitating estimation of the state of awareness of the communication apparatuses 100 and 200 that are transmission sources.

FIG. 9 illustrates an example of an attention calling transmission decision table. In Preferred Embodiment 2, the vehicle information controller 8 controls the transmission of the attention calling information on the basis of, for example, the attention calling transmission decision table illustrated in FIG. 9.

For example, the vehicle information controller 8, when there is a high risk of collision or contact on the basis of FIG. 9, determines whether or not to request the communication unit 6 to transmit the attention calling information, on the basis of the movement states and the operation states received from the communication apparatuses 100 and 200 that are transmission sources. Here, the table is referred to as an "attention calling transmission decision table." That is, when it is determined, by the risk determination unit 82, that there is a high risk of contact or collision, the communication control determination unit 84 of the vehicle information controller 8 determines whether or not to transmit the attention calling information via the communication unit 6 to the corresponding communication apparatus 100, 200 that is the transmission source.

For example, consider the case where there is a high risk of collision or contact or where the user is highly likely to not notice such a collision immediately before the collision. When the terminal information indicating that the user is on a call while walking is received from a communication apparatus 100, 200 that is a transmission source, it is estimated that the user is not paying attention to the surroundings, and therefore the attention calling information is transmitted to the communication apparatus 100, 200, which is the transmission source, as illustrated in FIG. 9. On the other hand, when the user is not performing a screen operation while running or bicycling and the screen is OFF, it is estimated that the user is paying attention to the surroundings, and the attention calling information is not transmitted. In the other movement states and the other operation states, the transmission of information is determined as illustrated in FIG. 9.

Figure 10:
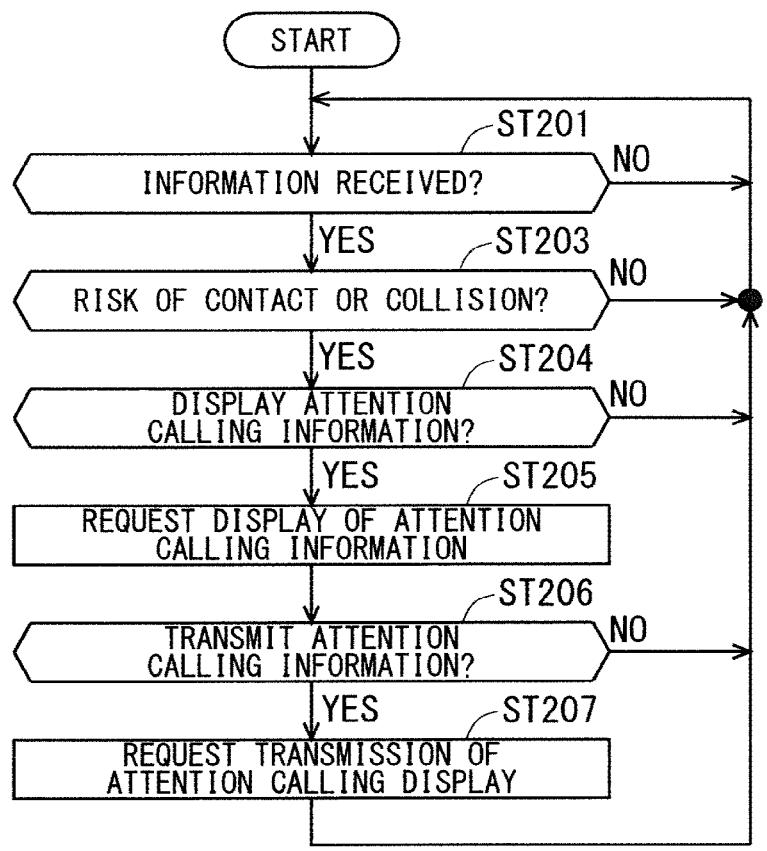
FIG. 10 is a flowchart of operations performed by a vehicle information controller of a communication apparatus according to Preferred Embodiment 2 of the present invention.

Operations will now be described. FIG. 10 is a flowchart of operations performed by the vehicle information controller 8 of the communication apparatus 200 according to Preferred Embodiment 2 of the present invention.

The information management unit 81 of the vehicle information controller 8 determines whether or not information has been received from the communication unit 6 after startup (step ST201). That is, whether or not the terminal information has been received from a peripheral communication apparatus 100 or 200 is determined.

When no information has been received in step ST201 ("NO" in step ST201), the information management unit 81 of the vehicle information controller 8 repeats the processing in step ST201 and continues to wait for the reception of information. When information has been received in step ST201 ("YES" in step ST201), the risk determination unit 82 of the vehicle information controller 8 determines, on the basis of the received terminal information (e.g., movement information and operation state) and its own terminal information (e.g., movement information), whether there is the risk of contact or collision (step ST203). Note that a method similar to that in the step ST109 of FIG. 7 may be used for the calculation and estimation of the risk of contact or collision, but the present invention is not limited to this example.

When it is determined in step ST203 that there is no risk ("NO" in step ST203), the procedure returns to step ST201 and waits for the reception of information. When it is determined in step ST203 that there is a risk ("YES" in step ST203), the display control determination unit 83 determines whether or not to display the attention calling information, on the basis of the display decision table illustrated in FIG. 2 (step ST204). More specifically, the display control determination unit 83 receives input of the movement state and the operation state that the information management unit 81 has received from the communication apparatus 100, 200 in step ST201, and determines, on the basis of the display decision table in FIG. 2, whether or not to display the attention calling information on the display unit 5.

When it is determined not to display the attention calling information in step ST204 ("NO" in step ST204), the procedure returns to step ST201 and waits for the reception of information. When it is determined to display the attention calling information in step ST204 ("YES" in step ST204), the display control determination unit 83 requests the display unit 5 to display the attention calling information (step ST205).

Moreover, the communication control determination unit 84 of the vehicle information controller 8 determines whether or not to transmit the attention calling information, on the basis of the attention calling transmission decision table illustrated in FIG. 9 (step ST206). More specifically, the communication control determination unit 84 receives input of the movement state and the operation state that the information management unit 81 has received via the communication unit 6 from the communication apparatus 100 in step ST201, and determines whether or not to transmit the attention calling information to the communication unit 6, on the basis of the attention calling transmission decision table in FIG. 9.

When it is determined not to transmit the attention calling information in step ST206 ("NO" in step ST206), the procedure returns to step ST201 and waits for the reception of information. When it is determined to transmit the attention calling information in step ST206 ("YES" in step ST206), the communication control determination unit 84 requests the communication unit 6 to transmit the information (step ST207).

Thereafter, the procedure returns to step ST201 and waits for the reception of the next information. While in FIG. 10, the type of information to be displayed and the transmission of the attention calling information are determined after display has been determined, the order of processing is not limited to this example.

Figure 11:
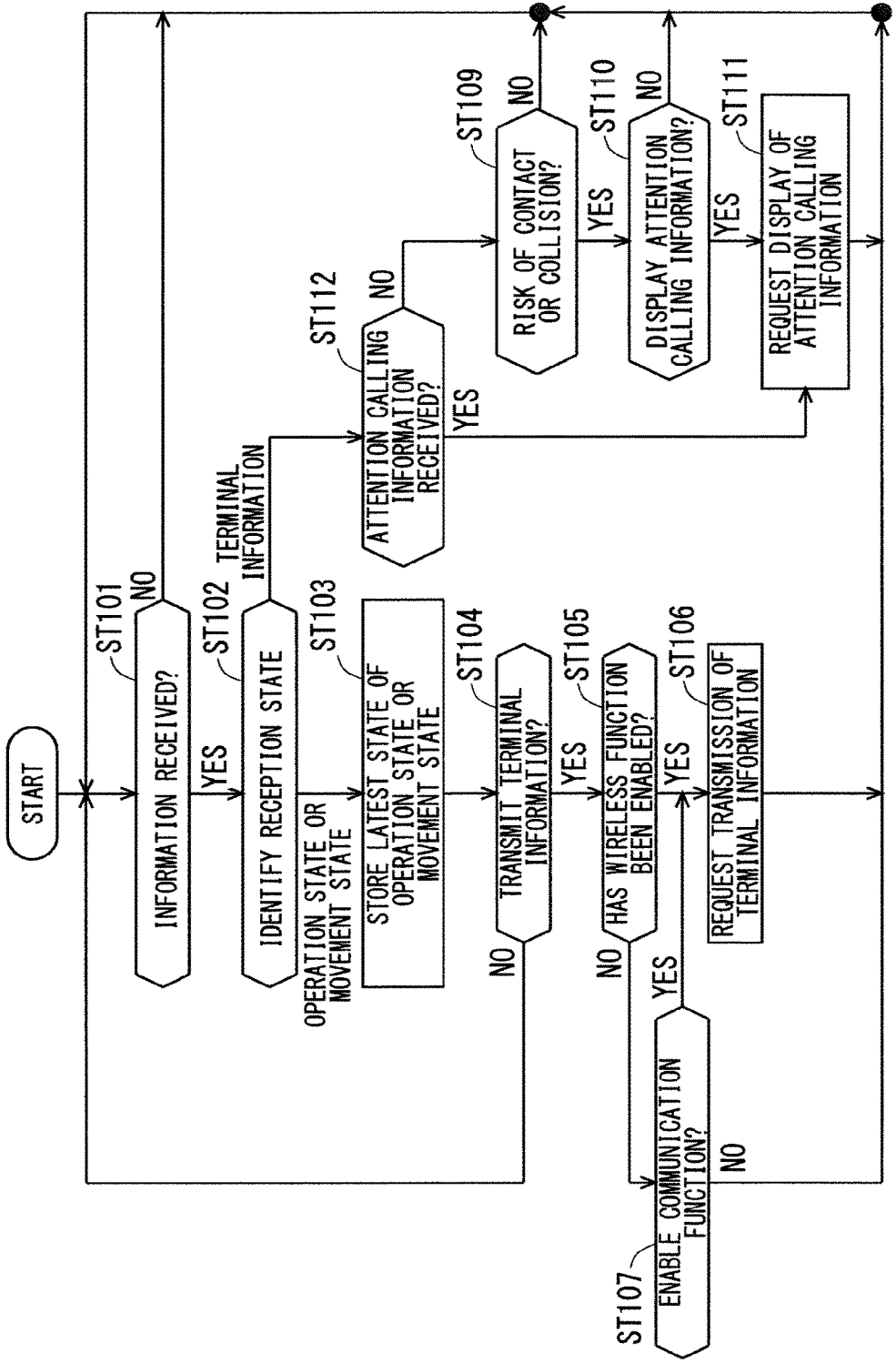
FIG. 11 is a flowchart of operations performed by a terminal controller of the communication apparatus according to Preferred Embodiment 2 of the present invention.

FIG. 11 is a flowchart of operations performed by the terminal information controller 7 of a communication apparatus 100 according to Preferred Embodiment 2 of the present invention. FIG. 11 illustrates the same processing as in the flowchart of FIG. 7 for the terminal information controller 7 of Preferred Embodiment 1, but differs from Preferred Embodiment 1 in that step ST112 is performed after step ST102. Here, only the difference (step ST112) will be described in detail.

In step ST112, the information management unit 71 of the terminal information controller 7 determines whether or not the terminal information received from another communication apparatus (operation assistance apparatus) 200 includes attention calling information (step ST112). When the attention calling information is included ("YES" in step ST112), the procedure proceeds to step ST111 to perform attention calling display, and when the attention calling information is not included ("NO" in step ST112), the procedure proceeds to step ST109 as in Preferred Embodiment 1.

While in FIG. 11, whether the attention calling information has been received is determined after the reception of the terminal information, the order of processing is not limited to this example. While in step ST112 of FIG. 11, the received attention calling information is displayed, whether or not to display the information may be determined after the processing from steps ST109 to ST110 has ended.

While, as described with reference to FIG. 10, Preferred Embodiment 2 shows an example in which the vehicle information controller 8 of the communication apparatus 200 transmits the attention calling information to an inattentive user, the information does not necessarily have to be transmitted. Also, while Preferred Embodiment 2 shows an example in which the vehicle information controller 8 uses the tables illustrated in FIGS. 2, 6, and 9, the processing may be implemented by using one of the tables, or by using a combination of a plurality of the tables.

While ETSI and SAE are taken as examples of the message formats handled by the communication unit 6 of Preferred Embodiment 2, the present invention is not limited to this example. The communication unit 6 may use Japanese message formats, or message formats that will be newly defined in the future, and the present invention is not limited to these examples as long as the message includes a reserved partition or extended partition.

While in the above example, the communication apparatus 200 of Preferred Embodiment 2 transmits the attention calling information to the communication apparatuses 100, a configuration is also possible in which the communication apparatus 200 transmits attention calling information to a peripheral communication apparatus 200, and the vehicle information controller 8 that has received the information displays the attention calling information. Alternatively, the attention calling information may be transmitted from the communication apparatuses 100 to the communication apparatus 200.

As described above, according to Preferred Embodiment 2, display of calling attention to dangers and the contents to be displayed can be controlled on the basis of the terminal information received from the communication apparatuses 100 and 200 held by the users such as pedestrians or bicyclists. It is thus possible, in advance, to detect users who have been prone to delayed risk detection, and it can be expected to reduce accidents caused by such drivers.

Also, in Preferred Embodiment 2, it is possible to call the attention of drivers to jaywalking pedestrians and bicyclists and the like (that suddenly appear on the road), which have been unavoidable, assist the users in preventing delayed risk detection, and transmit the attention calling to inattentive users in the surrounding area. It is thus expected to reduce accidents that cause injury to the users.

Moreover, in Preferred Embodiment 2, the movement state and the operation state are additionally stored in the reserved partition or extended partition in an internationally standardized message format. This allows the reception-side communication apparatus 100 to easily estimate the state of awareness of the user while maintaining compatibility between existing ITS systems and messages, thus reducing changes to the existing systems.

While the communication apparatus 200 of Preferred Embodiment 2 is configured as illustrated in FIG. 8, the configuration of the communication apparatus 200 need only include the sensor 1, the communication unit 6, and the vehicle information controller 8. The display unit 5 may be provided within the communication apparatus 200, or may be provided outside the communication apparatus 200, as in Preferred Embodiment 1.

Preferred Embodiment 3

While in Preferred Embodiment 1, the movement state of the communication apparatus 100 is estimated within the communication apparatus 100 held by the user, Preferred Embodiment 3 describes a preferred embodiment in which the movement state of the communication apparatus 100 is estimated in a cloud server.

FIG. 12 is a schematic diagram of an operation assistance system that includes a communication apparatus 101 according to Preferred Embodiment 3 of the present invention. Note that the communication apparatus 101 of Preferred Embodiment 3 is mounted to a moving object as in Preferred Embodiment 1, and is assumed to be mounted principally to a mobile terminal in the following description. Constituent elements that are similar to those described in Preferred Embodiment 1 are given the same reference numerals, and redundant detailed descriptions thereof are omitted.

As illustrated in FIG. 12, the operation assistance system according to Preferred Embodiment 3 includes the communication apparatus 101, a communication network 300, and a cloud server 400. The communication apparatus 101 and the cloud server 400 are connected to each other via the communication network 300.

The communication apparatus 101 of Preferred Embodiment 3 differs from the communication apparatus 100 of Preferred Embodiment 1 in that the movement-state estimation unit 2 is mounted to the cloud server 400. The system includes at least one communication apparatus 101 and may include a plurality of communication apparatuses 101. Also, the system may include one cloud server 400 or a plurality of cloud servers 400. While the present preferred embodiment uses the cloud server, a general-purpose calculating machine such as a central control server or a calculator server may be used, instead of the cloud server.

As illustrated in FIG. 12, the communication apparatus 101 includes a sensor 1, a user operation I/F unit 3, an operation-state management unit 4, a display unit 5, a communication unit 6, and a terminal information controller 7. Note that constituent elements that are similar to those of the communication apparatus 100 described with reference to FIG. 1 in Preferred Embodiment 1 are given the same reference numerals, and redundant descriptions thereof are omitted. The communication apparatus 101 in FIG. 12 differs from the communication apparatus 100 in FIG. 1 only in that the movement-state estimation unit 2 is not included. Note that the information management unit 71 of the communication apparatus 101 does not manage the movement state.

The terminal information controller 7 of the communication apparatus 101 transmits, in addition to the terminal information, sensing information that includes the movement information detected by the sensor 1 to the cloud server 400 via the communication unit 6. The terminal information controller 7 also receives the movement state from the cloud server 400 via the communication unit 6.

As illustrated in FIG. 12, the cloud server 400 includes the movement-state estimation unit 2, a communication unit 6, and a terminal-information management unit 9.

The terminal-information management unit 9 of the cloud server 400 functions as a database that stores the sensing information and the terminal information that are received from a plurality of communication apparatuses 101 via the communication unit 6. The terminal-information management unit 9 also stores reference patterns for use in estimating the movement state.

Note that the terminal-information management unit 9 is configured as, for example, a large-capacity storage medium such as a hard disk or a solid-state drive (SSD). The data format for storage may be XML (extensible Markup Language), or may use a database such as MySQL or MIB (Management Information Base), but the present invention is not limited to this example.

The communication unit 6 of the cloud server 400 receives the sensing information from the communication apparatus 101 and transmits the result of estimation of the movement state to the communication apparatus 101.

The movement-state estimation unit 2 of the cloud server 400 estimates the movement states of the communication apparatuses 101 that are transmission sources of the stored sensing information, on the basis of the sensing information stored in the terminal-information management unit 9, and notifies the estimation results to the communication apparatuses 101 that are the transmission sources via the communication unit 6.

Note that the movement-state estimation unit 2 may estimate the movement states directly from the sensing information stored in the terminal-information management unit 9, or may estimate the movement states by comparison with the reference patterns, or may use other methods of estimation.

The terminal information controller 7 of the communication apparatus 101 receives information from the operation-state management unit 4, the communication unit 6, and the movement-state estimation unit 2 of the cloud server 400, and performs operations as described with reference to FIG. 7 in Preferred Embodiment 1. In Preferred Embodiment 1, information is acquired from the movement-state estimation unit 2 of the communication apparatus 100, and Preferred Embodiment 3 differs from Preferred Embodiment 1 only in that information is acquired from the movement-state estimation unit 2 of the cloud server 400 (step ST101). The other processing is the same as the processing described in Preferred Embodiment 1, and therefore detailed descriptions thereof are omitted.

While in Preferred Embodiment 3, the risk determination unit 72 of the terminal information controller 7 calculates the possibility of contact or collision within the communication apparatus 101, the present invention is not limited to this example, and the cloud server 400 may calculate the possibility of contact or collision (determine whether the attention calling state has occurred) on the basis of a large number of collected pieces of terminal information (terminal information of the communication apparatus and terminal information of other communication apparatuses). The cloud server 400 may determine the risk by calculating the positional relationship and relative speeds of the respective communication apparatuses 101 on the basis of the collected terminal information and transmit the attention calling information and the above movement state to the communication apparatuses 101, and the communication apparatus 101 may, for example, control the attention calling information to be displayed on its own apparatus on the basis of the table in FIG. 6 that uses the movement state and the operation state.

While in Preferred Embodiment 3, the terminal-information management unit 9 stores the sensing information and the terminal information, the present invention is not limited to this example. The terminal-information management unit 9 may store either the sensing information or the terminal information, or may store other information.

As described above, according to Preferred Embodiment 3, the cloud server has centralized control over estimation of the movement state and estimation of the risk. It can thus be expected to reduce the processing load on the communication apparatus 101 and enable high-precision estimation of the movement state using a large number of pieces of sensing information.

In Preferred Embodiment 3, the cloud server collectively performs processing and is thus able to estimate risks even between communication apparatuses to which radio waves cannot reach directly. This enables early determination of whether or not to call the attention of users.

Preferred Embodiment 4

While in Preferred Embodiment 1, display and communication, for example, is controlled on the basis of the movement state and the operation state, Preferred Embodiment 4 describes a preferred embodiment in which map information is linked with processing, in addition to the movement state and the operation state.

Figure 13:
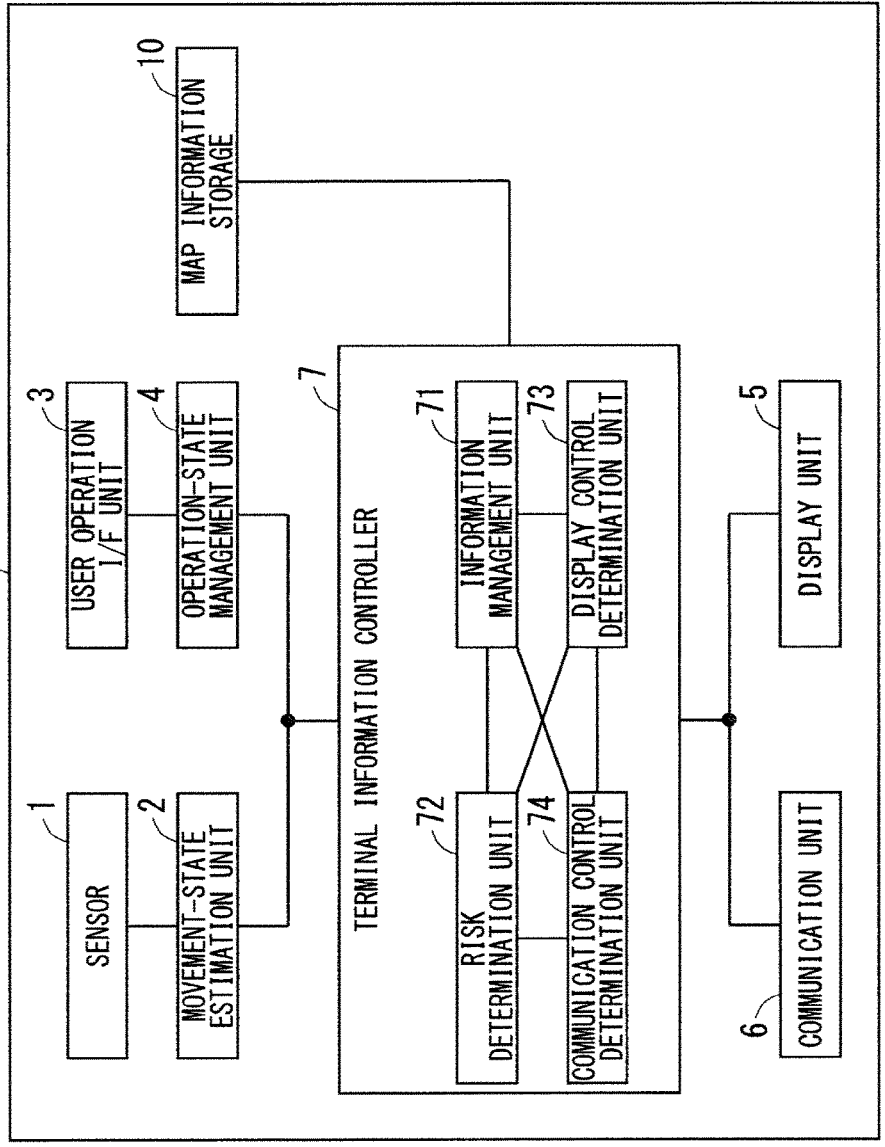
FIG. 13 is a schematic diagram of a communication apparatus according to Preferred Embodiment 4 of the present invention.

FIG. 13 is a schematic diagram of a communication apparatus 102 according to Preferred Embodiment 4 of the present invention. Note that the communication apparatus 102 of Preferred Embodiment 4 is mounted to a moving object, and is assumed to be mounted principally to a mobile terminal in the following description. In FIG. 13, constituent elements that are the same as those described with reference to FIG. 1 in Preferred Embodiment 1 are given the same reference numerals, and redundant detailed descriptions thereof are omitted.

As illustrated in FIG. 13, the communication apparatus 102 according to Preferred Embodiment 4 of the present invention differs from the communication apparatus 100 described with reference to FIG. 1 in Preferred Embodiment 1 only in that a map information storage (map information management unit) 10 is further provided.

The map information storage 10 manages, as map information, information such as road shape, road type (e.g., highways, general roads, sidewalks, or cycling roads), road width, the number of lanes, road gradients, road signs, the curvatures of curves, and landmarks indicating distinctive buildings, along with latitude, longitude, and altitude. The map information storage 10 outputs map information concerning the peripheries of the current location to the terminal information controller 7.

The map information storage 10 is configured as, for example, a large-capacity storage medium such as a hard disk or an SSD. The data format for storage may be XML format, or may use a database such as MySQL, SQLite, or MIB, but the present invention is not limited to these examples.

Operations will now be described. The operations performed by the communication apparatus 102 according to Preferred Embodiment 4 are basically similar to those of the communication apparatus 100 according to Preferred Embodiment 1, and differs in the content of operations performed by the terminal information controller 7. Hereinafter, redundant descriptions of operations of the communication apparatus 102 that are similar to those of the communication apparatus 100 described in Preferred Embodiment 1 are omitted, and only differences will be described.

In Preferred Embodiment 4, the terminal information controller 7 makes a sophisticated determination as to the need to call the attention of the user by determining the risk according to the place where the user of the communication apparatus 102 is situated, such as sidewalks, roadways, crosswalks, pedestrian subways, stations, his or her own house, indoors or outdoors, road widths, roadsides, near intersections, alleys, and locations where the user is highly unlikely to notice an impending collision, for example, until immediately before the collision. That is, in Preferred Embodiment 4, the terminal information controller 7 of the communication apparatus 102 takes into consideration the map information managed by the map information storage 10 when making a determination regarding control that uses the tables illustrated in FIGS. 2 to 6. At this time, the processing described with reference to FIGS. 2 to 6 may be controlled according to whether the current location of the user is a place where a vehicle can be driven, may be controlled according to visibility conditions, or may be controlled according to the occurrences of past accidents, but the present invention is not limited to these examples.

FIG. 14 illustrates an example of a table for use in control based on the movement state estimated by the movement-state estimation unit 2 and the map information stored in the map information storage 10 according to Preferred Embodiment 4 of the present invention.

For example, when the display control determination unit 73 of the terminal information controller 7 determines on the basis of the display decision table in FIG. 2 whether or not to display information (step ST110 in FIG. 7), the display control determination unit 73 uses the table in FIG. 14 as a basis for determination of display control, in addition to the display decision table in FIG. 2.

More specifically, in the case where the user is performing a screen operation while walking, the attention calling information based on FIG. 2 is displayed in Preferred Embodiment 1, but in Preferred Embodiment 4, further determination based on FIG. 14 is made, and the attention calling information is not displayed when the user is in a less dangerous area such as a sidewalk, a station, or indoors.

Moreover, for example, when the communication control determination unit 74 of the terminal information controller 7 deter mines on the basis of the transmission decision table in FIG. 3 whether or not to transmit information (step ST104 in FIG. 7), the communication control determination unit 74 uses the table in FIG. 14 as a basis for determination of transmission control, in addition to the transmission decision table in FIG. 3.

More specifically, in the case where the user is walking, running, bicycling, or riding a motorcycle, the terminal information is transmitted, irrespective of the presence or absence of a screen operation, to the surrounding area on the basis of FIG. 3 in Preferred Embodiment 1, but in Preferred Embodiment 4, further determination based on FIG. 14 is made, and the information is transmitted only when the user is in a dangerous place such as a sidewalk, a roadway, or an intersection.

While the above description takes the example of the processing in steps ST104 and ST110 of FIG. 7, the terminal information controller 7 further uses a table such as illustrated in FIG. 14 that includes preset control contents based on the map information as a basis in the control determination processing in FIG. 7 that uses FIGS. 2 to 6, and also links the map information with the other movement states and operation states to make appropriate determinations according to the situation.

In this way, in Preferred Embodiment 4, the terminal information controller 7 uses a table such as illustrated in FIG. 14, in addition to the tables as illustrated in FIGS. 2 to 6, as a basis to control ON/OFF of attention calling display, control the transmission of the terminal information and the transmission cycle, control ON/OFF of the communication hardware, and switch the type of the attention calling information.

In FIG. 14, the states stored in the map information storage 10 are assumed to include whether the road type is a pedestrian scramble, whether the terminal is located indoors or outdoors, and whether the apparatus is located inside or outside of the line of sight, but the present invention is not limited to these examples.

While in the present example, the communication apparatus 102 manages the map information within the communication apparatus 102 to call the attention of users or determine whether or not to perform transmission, Preferred Embodiment 4 may be applied to Preferred Embodiment 3, in which case the cloud server 400 further includes the map information storage 10 to manage the map information, and the communication apparatus 102 acquires the map information to perform processing and make determination. Alternatively, the cloud server 400 that manages the map information may be configured to perform risk determinations.

For example, the cloud server 400 may predict a future position on the basis of the transition of past positions and the travel speed and further take the map information into consideration to determine that, when the apparatus is located on a sidewalk or inside of the line of sight, there is a low risk and the transmission of the attention calling information is unnecessary. In this way, more sophisticated risk determination is possible with the cloud server 400.

Preferred Embodiment 4 may also be applied to Preferred Embodiment 2, in which case the communication apparatuses 100 and 200 of Preferred Embodiment 2 further include the map information storage 10.

The communication apparatus 102 may perform processing according to the surrounding environment through map matching that is linked with the map information, even when the position of the terminal is not sufficiently accurate.

As described above, according to Preferred Embodiment 4, the map information is linked with risk estimation. It is thus possible to more appropriately call the attention of users, transmit the terminal information, enable the wireless function, change the transmission cycle, and change the type of the attention calling information. Thus, as compared with Preferred Embodiment 1, it can be expected to improve user acceptability, suppress unnecessary transmission of radio waves, and implement power savings on the communication apparatuses 100 and 200.

In Preferred Embodiment 4, the surrounding environment of the user can be estimated by using the map information, even if the accuracy of the position information is low. Thus, effective control can be expected at the time of providing information or in transmission processing, for example.

Preferred Embodiment 5

While in Preferred Embodiment 1, display and communication, for example, is controlled based on the movement state and the operation state, Preferred Embodiment 5 describes a preferred embodiment in which personal characteristic information is linked with processing, in addition to the movement state and the operation state.

FIG. 15 is a schematic diagram of a communication apparatus 103 according to Preferred Embodiment 5 of the present invention. Note that the communication apparatus 103 according to Preferred Embodiment 5 is mounted to a moving object. In FIG. 15, constituent elements that are the same as those described with reference to FIG. 1 in Preferred Embodiment 1 are given the same reference numerals, and redundant detailed descriptions thereof are omitted.

The communication apparatus 103 according to Preferred Embodiment 5 of the present invention differs from the communication apparatus 100 described with reference to FIG. 1 in Preferred Embodiment 1 only in that a personal characteristic management unit 11 is further included as illustrated in FIG. 15.

The personal characteristic management unit 11 manages personal characteristic information such as the age, gender, behavior patterns, and behavioral characteristics of the user of the communication apparatus 103, and outputs the personal characteristic information to the terminal information controller 7.

As the personal characteristics, the behavior patterns and the behavioral characteristics may be managed in combination with the past history, or repeated behavior or the like may be learned.

Operations will now be described. The operations performed by the communication apparatus 103 according to Preferred Embodiment 5 are basically similar to those of the communication apparatus 100 according to Preferred Embodiment 1, but differ in the operations of the terminal information controller 7. Hereinafter, redundant descriptions of operations of the communication apparatus 103 that are similar to those of the communication apparatus 100 described in Preferred Embodiment 1 are omitted, and only the difference will be described below.

The terminal information controller 7 of the communication apparatus 103 makes a sophisticated determination of the need to call the attention of users by determining the risk according to the characteristics of the terminal holder, such as the age, gender, personality, behavior patterns, and behavioral characteristics of the user of the communication apparatus 103. That is, in Preferred Embodiment 5, the terminal information controller 7 of the communication apparatus 103 takes into consideration the personal characteristic information managed by the personal characteristic management unit 11 to make a determination for control that uses the tables in FIGS. 2 to 6. At this time, the processing illustrated in FIGS. 2 to 6 may be controlled by weighting according to the age such as children or elderly people, or may be controlled according to the individual personality such as the level of cautiousness or adaptability, but the present invention is not limited to these examples.

For example, in the case of determining whether or not to display information on the basis of the display decision table in FIG. 2 (step ST110 in FIG. 7), the display control determination unit 73 of the terminal information controller 7 makes a determination for display control on the basis of the personal characteristic information managed by the personal characteristic management unit 11, in addition to the display decision table in FIG. 2.

More specifically, when the user is performing a screen operation while walking, the attention calling information is displayed on the basis of FIG. 2 in Preferred Embodiment 1. In Preferred Embodiment 5, the personal characteristic information is further used as a basis, and when the user is an elderly person, it is determined necessary to increase the size of characters to be displayed for attention calling on the screen or to increase the volume of audio to be output.

While the above description takes the example of the processing in step ST110 of FIG. 7, the terminal information controller 7 uses the personal characteristic information managed by the personal characteristic management unit 11 as a basis in the control determination processing in FIG. 7 that uses FIGS. 2 to 6, and also links the personal characteristic information with the other movement states and operation states to make appropriate determinations according to the situation.

While in the present example, the communication apparatus 103 manages the personal characteristic information within the communication apparatus 103 to call the attention of users or determine whether or not to perform transmission, Preferred Embodiment 5 may be applied to Preferred Embodiment 3, in which case the cloud server 400 includes the personal characteristic management unit 11 to manage the personal characteristic information, and the communication apparatus 103 acquires the personal characteristic information to perform processing and make determinations.

Alternatively, the cloud server 400 that manages the personal characteristic information may even perform risk determination. For example, when the personal characteristic information indicates that the user is a child or elderly person, the cloud server 400 may determine that there is a risk, or the cloud server 400 may determine the presence of a risk on the basis of behavior characteristics such as crossing roads with no crosswalks or crossing intersections of alleys without slowing down the speed or looking left and right. In this way, more sophisticated risk determination is possible with the cloud server 400.

Preferred Embodiment 5 may also be applied to Preferred Embodiment 2, in which case the communication apparatuses 100 and 200 of Preferred Embodiment 2 further include the personal characteristic management unit 11. Preferred Embodiment 5 may also be applied to Preferred Embodiment 4, in which case the communication apparatus 102 of Preferred Embodiment 4 includes the personal characteristic management unit 11.

The personal characteristic information may be included in the terminal information and transmitted to other communication apparatuses 103. That is, the communication apparatus 103 may transmit the personal characteristic information to another peripheral communication apparatus 103, and the other communication apparatus 103 that has received the personal characteristic information may use the received personal characteristic information to call the attention of users or determine whether or not to perform transmission.

As described above, according to Preferred Embodiment 5, the personal characteristic information is linked with risk estimation. It is thus possible to, according to the characteristics of the user, call the attention of users, transmit the terminal information, enable the wireless function, change the transmission cycle, and change the type of the attention calling information. Thus, it can be expected to improve user acceptability, suppress unnecessary transmission of radio waves, and implement power savings on the communication apparatus 103.

Note that the present invention may be taken as a communication apparatus that includes at least part of the above means. The present invention may also be taken as a communication apparatus that includes at least part of the above processing, or as a method for implementing such an apparatus.

Note that the invention of the present application may freely combine each preferred embodiment or may modify or omit arbitrary constituent elements of each preferred embodiment within the scope of the invention.

Each unit used for control by the communication apparatuses of Preferred Embodiments 1 to 5 is implemented by program processing using a CPU based on software.

FIG. 16 is a block diagram illustrating an example of a communication apparatus according to each of Preferred Embodiments 1 to 5. This communication apparatus includes a receiver 31, a memory 32, a processor 33 that includes, for example, a central processing unit (CPU), and a display apparatus 34. While in the present example, the communication apparatus includes the display apparatus 34, the communication apparatus and the display apparatus 34 may be provided separately.

The receiver 31 corresponds to, for example, the sensor 1, the user operation I/F unit 3, and the communication unit 6 in FIG. 1. The display apparatus 34 corresponds to, for example, the display unit 5 and the communication unit 6 in FIG. 1. The movement-state estimation unit 2, the operation-state management unit 4, and the terminal information controller 7 (hereinafter, referred to as a "movement-state estimation unit 2, etc.") are implemented as functions of the processor 33 by the processor 33 executing programs stored in storage apparatuses such as the memory 32. The above functions may be implemented by the cooperation of a plurality of processors 33.

Note that, instead of using the movement-state estimation unit 2, etc. that are implemented by the processor 33 operating in accordance with software programs, the communication apparatus may use the movement-state estimation unit 2, etc. that are implemented by a signal processing circuitry in which the operation of the processor 33 is implemented by hardware electric circuits. The term "unit" may be replaced by the term "processing circuitry" as the concept that combines the movement-state estimation unit 2, etc. that are implemented by software and the movement-state estimation unit 2, etc. that are implemented by hardware.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1: Sensor, 2: Movement-state estimation unit, 3: User operation I/F unit, 4: Operation-state management unit, 5: Display unit, 6: Communication unit, 7: Terminal information controller, 8: Vehicle information controller, 9: Terminal-information management unit, 10: Map information storage, 11: Personal characteristic management unit, 71: Information management unit, 72: Risk determination unit, 73: Display control determination unit, 74: Communication control determination unit, 81: Information management unit, 82: Risk determination unit, 83: Display control determination unit, 84: Communication control determination unit, 100 to 103, 200: Communication apparatus, 300: Communication network, 400: Cloud server

The invention claimed is:

1. A communication apparatus for wirelessly communicating with another movable communication apparatus and being movable along with a moving object, comprising:
   a sensor;
   a processor including circuitry configured to perform as a movement-state estimator that estimates a movement state of said moving object on the basis of information that includes movement information of said communication apparatus that is detected by the sensor;
   the circuitry in the processor is further configured to perform as an operation-state manager that specifies an operation state of operations performed on said communication apparatus by a user, and manages the operation state that includes a time elapsed after a latest operation was performed on said communication apparatus without any intervening operations performed on said communication apparatus during the elapsed time;
   the circuitry in the processor is further configured to perform as a communication processor that transmits terminal information that includes at least the movement information of said communication apparatus to said another communication apparatus, and receives another terminal information that includes at least movement information of said another communication apparatus from said another communication apparatus; and
a terminal information controller that controls transmission of said terminal information from said communication processor to said another communication apparatus on the basis of said movement state estimated by said movement-state estimator and said operation state managed by said operation-state manager, and when it is determined on the basis of said terminal information and said another terminal information received by said communication processor that an attention calling state has occurred, controls display information that causes a display to display attention calling information on the basis of said movement state and said operation state, wherein,
said movement state includes:
when said moving object is a user, states indicating how the user is stationary, states indicating whether or not the user is walking, states indicating whether or not the user is running, and states indicating whether or not the user is not holding said communication apparatus; when said moving object is a bicycle, states indicating whether or not the bicycle is ridden, when said moving object is an automobile, states indicating whether or not the automobile is ridden or driven; when said moving object is a bus, states indicating whether or not the bus is ridden; and when said moving object is a train, states indicating whether or not the train is ridden,
said operation state includes:
states indicating whether or not the user is on a call, states indicating whether or not the user is performing a screen operation, and states indicating whether or not a predetermined period of time has elapsed after a screen operation,
said terminal information controller transmits said terminal information and displays attention calling information on said display when said movement state is one of the state indicating the user is walking, the state indicating the user is running, and the state indicating the bicycle is ridden, and when said operation state is one of the state indicating the user is on a call, the state indicating the user is performing a screen operation, and the state indicating a predetermined period of time has not elapsed after a screen operation, and
said terminal information controller does not transmit said terminal information and does not display attention calling information on said display when said movement state is one of the state indicating the automobile is ridden, the state indicating the bus is ridden, and the state indicating the train is ridden, and when said operation state is one of the state indicating the user is not performing a screen operation and the state indicating a predetermined period of time has elapsed after a screen operation.

2. The communication apparatus according to claim 1, wherein
said movement information of said communication apparatus includes a position and speed of said communication apparatus or a position history of said communication apparatus.

3. The communication apparatus according to claim 1, wherein
said terminal information controller has said movement state and said operation state included in said terminal information and transmits said terminal information to said another communication apparatus.

4. The communication apparatus according to claim 3, wherein
when a user has set to disable a communication function of said communication processor, said terminal information controller enables and disables the communication function of said communication processor based on the movement state and said operation state.

5. The communication apparatus according to claim 3, wherein
said terminal information controller controls a transmission cycle for use in transmitting said terminal information from said communication processor to said another communication apparatus, on the basis of said movement state and said operation state.

6. The communication apparatus according to claim 1, wherein:
the circuitry in the processor is further configured to perform as a map information manager that manages map information, and
said terminal information controller controls transmission of said terminal information from said communication processor to said another communication apparatus on the basis of said movement state, said operation state, and said map information, and when it is determined on the basis of said terminal information and said another terminal information received by said communication processor that an attention calling state has occurred, controls display information that causes said display to display attention calling information on the basis of said movement state, said operation state, and said map information.

7. The communication apparatus according to claim 1, wherein:
the circuitry in the processor is further configured to perform as a personal characteristic manager that manages personal characteristic information, and
said terminal information controller controls transmission of said terminal information from said communication processor to said another communication apparatus on the basis of said movement state, said operation state, and said personal characteristic information, and when it is determined on the basis of said terminal information and said another terminal information received by said communication processor that an attention calling state has occurred, controls display information that causes said display to display attention calling information on the basis of said movement state, said operation state, and said personal characteristic information.

8. An operation assistance system comprising:
the communication apparatus according to claim 1; and
an operation assistance apparatus that is used as said another communication apparatus, said operation assistance apparatus for a vehicle that wirelessly communicates with a movable communication apparatus, comprising:
another processor including circuitry configured to perform as an operation assistance communication processor that receives movement information of said communication apparatus and an operation state of operations performed on said communication apparatus by a user, the operation state including a time elapsed after a latest operation was performed on said communication apparatus; and
a vehicle information controller that calls attention of a driver of said vehicle when it is determined that an attention calling state has occurred, on the basis of movement information of said operation assistance apparatus that is detected by a sensor that targets said operation assistance apparatus for detection, and said movement information and said operation state of said communication apparatus that are received by said operation assistance communication processor.

9. A communication apparatus for wirelessly communicating with a cloud server capable of wireless communication with another movable communication apparatus, and being movable along with a moving object, comprising:
a processor including circuitry configured to perform as an operation-state manager that specifies an operation state of operations performed on said communication apparatus by a user and manages the operation state, the operation state including a time elapsed after a latest operation was performed on said communication apparatus without any intervening operations performed on said communication apparatus during the elapsed time;
the circuitry in the processor is further configured to perform as a communication processor that transmits terminal information to said cloud server, said terminal information including movement information of said communication apparatus that is detected by a sensor that targets said communication apparatus for detection, and when said cloud server has determined that an attention calling state has occurred, on the basis of said terminal information that is received from said communication apparatus and other terminal information that is received from said another communication apparatus and includes movement information of said another communication apparatus, receives attention calling information and a movement state of said moving object from said cloud server; and
a terminal information controller that controls display information that causes a display to display said attention calling information on the basis of said movement state and said operation state, wherein,
said movement state includes:
when said moving object is a user, states indicating how the user is stationary, states indicating whether or not the user is walking, states indicating whether or not the user is running, and states indicating whether or not the user is not holding said communication apparatus; when said moving object is a bicycle, states indicating whether or not the bicycle is ridden; when said moving object is an automobile, states indicating whether or not the automobile is ridden or driven; when said moving object is a bus, states indicating whether or not the bus is ridden; and when said moving object is a train, states indicating whether or not the train is ridden,
said operation state includes:
states indicating whether or not the user is on a call, states indicating whether or not the user is performing a screen operation, and states indicating whether or not a predetermined period of time has elapsed after a screen operation, said terminal information controller transmits said terminal information and displays attention calling information on said display when said movement state is one of the state indicating the user is walking, the state indicating the user is running, and the state indicating the bicycle is ridden, and when said operation state is one of the state indicating the user is on a call, the state indicating the user is performing a screen operation, and the state indicating a predetermined period of time has not elapsed after a screen operation, and said terminal information controller does not transmit said terminal information and does not display attention calling information on said display when said movement state is one of the state indicating the automobile is ridden, the state indicating the bus is ridden, and the state indicating the train is ridden, and when said operation state is one of the state indicating the user is not performing a screen operation and the state indicating a predetermined period of time has elapsed after a screen operation.

10. An operation assistance apparatus for a vehicle that wirelessly communicates with a communication apparatus being movable along with a moving object, comprising:

a processor including circuitry configured to perform as a communication processor that receives movement information of said communication apparatus and an operation state of operations performed on said communication apparatus by a user, the operation state including a time elapsed after a latest operation was performed on said communication apparatus without any intervening operations performed on said communication apparatus during the elapsed time; and a vehicle information controller that calls attention of a driver of said vehicle when it is determined that an attention calling state has occurred, on the basis of movement information of said operation assistance apparatus that is detected by a sensor that targets said operation assistance apparatus for detection, and said movement information and said operation state of said communication apparatus that are received by said communication processor, wherein, said movement information includes:

when said moving object is a user, states indicating how the user is stationary, states indicating whether or not the user is walking, states indicating whether or not the user is running, and states indicating whether or not the user is not holding said communication apparatus; when said moving object is a bicycle, states indicating whether or not the bicycle is ridden; when said moving object is an automobile, states indicating whether or not the automobile is ridden or driven; when said moving object is a bus, states indicating whether or not the bus is ridden; and when said moving object is a train, states indicating whether or not the train is ridden, said operation state includes:

states indicating whether or not the user is on a call, states indicating whether or not the user is performing a screen operation, and states indicating whether or not a predetermined period of time has elapsed after a screen operation, said vehicle information controller transmits a vehicle information to said communication apparatus and displays attention calling information to said driver of said vehicle when said movement information is one of the state indicating the user is walking, the state indicating the user is running, and the state indicating the bicycle is ridden, and when said operation state is one of the state indicating the user is on a call, the state indicating the user is performing a screen operation, and the state indicating a predetermined period of time has not elapsed after a screen operation, and said terminal information controller does not transmit said vehicle information to said communication apparatus and does not display attention calling information to said driver of said vehicle when said movement information is one of the state indicating the automobile is ridden, the state indicating the bus is ridden, and the state indicating the train is ridden, and when said operation state is one of the state indicating the user is not performing a screen operation and the state indicating a predetermined period of time has elapsed after a screen operation.

* * * * *